United States Patent [19]

Goto et al.

[11] Patent Number: 5,650,570

[45] Date of Patent: Jul. 22, 1997

[54] METHOD FOR MEASURING STRESS OF FERROMAGNETIC METAL MEMBER, METHOD FOR MEASURING STRESS DISTRIBUTION IN SHEET-LIKE SENSOR, AND SHEET-LIKE SENSOR FOR MEASURING STRESS DISTRIBUTION

[75] Inventors: Hajime Goto; Tadahiro Kubota; Jun Sasahara, all of Saitama, Japan

[73] Assignee: Honda Giken Kogyo Kabushiki Kaisha, Tokyo, Japan

[21] Appl. No.: 524,070

[22] Filed: Sep. 6, 1995

[30] Foreign Application Priority Data

Sep. 7, 1994 [JP] Japan ................................. 6-214013
Aug. 14, 1995 [JP] Japan ................................. 7-206962

[51] Int. Cl.⁶ ....................................... G01B 7/16
[52] U.S. Cl. ........................... 73/763; 73/768; 73/774
[58] Field of Search ............................ 73/763, 772, 768, 73/765, 774, 775

[56] References Cited

U.S. PATENT DOCUMENTS 4,050,313  9/1977  Shimada et al. .......................... 73/765
4,140,023  2/1979  Edwards et al. .......................... 73/765
4,142,405  3/1979  Stevens .................................... 73/763
4,503,710  3/1985  Oertle et al. ............................. 73/772
4,744,252  5/1988  Stout ....................................... 73/768

Primary Examiner—George M. Dombroske
Assistant Examiner—Max H. Noori
Attorney, Agent, or Firm—Lyon & Lyon LLP

[57] ABSTRACT

In measuring the stress of a ferromagnetic linear metal member, an alternating current is supplied to flow between a pair of terminals mounted to the ferromagnetic linear metal member to measure an impedance |Z| of the ferromagnetic linear metal member between the terminals by an analyzer. Then, a stress σ is determined based on the measured value of the impedance |Z| from an impedance |Z|-stress σ relationship possessed by the ferromagnetic linear metal member. The stress distribution in a sheet-like sensor can be likewise measured by inserting into the sensor a plurality of intersecting ferromagnetic linear metal members. The stress σ is determined for each individual member as described above, and then the stress distribution in the sheet-like sensor is determined by summing up the stresses of mutually intersecting members.

24 Claims, 22 Drawing Sheets

FIG.26

| | $A_1$ | $B_1$ | $C_1$ | $D_1$ | $E_1$ | |
|---|---|---|---|---|---|---|
| | $(A_1, A_2)$ | $(B_1, A_2)$ | $(C_1, A_2)$ | $(D_1, A_2)$ | $(E_1, A_2)$ | |
| $A_2$ | | 7.5 | 11.5 | 43.5 | 13.5 | 11.5 |
| | $(A_1, B_2)$ | $(B_1, B_2)$ | $(C_1, B_2)$ | $(D_1, B_2)$ | $(E_1, B_2)$ | |
| $B_2$ | | 28 | 32 | 64 | 34 | 32 |
| | $(A_1, C_2)$ | $(B_1, C_2)$ | $(C_1, C_2)$ | $(D_1, C_2)$ | $(E_1, C_2)$ | |
| $C_2$ | | 44 | 48 | 80 | 50 | 48 |
| | $(A_1, D_2)$ | $(B_1, D_2)$ | $(C_1, D_2)$ | $(D_1, D_2)$ | $(E_1, D_2)$ | |
| $D_2$ | | 20 | 24 | 56 | 26 | 24 |
| | $(A_1, E_2)$ | $(B_1, E_2)$ | $(C_1, E_2)$ | $(D_1, E_2)$ | $(E_1, E_2)$ | |
| $E_2$ | | 4 | 8 | 40 | 10 | 8 |

| | $A_1$ | $B_1$ | $C_1$ | $D_1$ | $E_1$ | |
|---|---|---|---|---|---|---|
| $A_2$ | $(A_1, A_2)$ 1 | $(B_1, A_2)$ 4 | $(C_1, A_2)$ 70.5 | $(D_1, A_2)$ 13.5 | $(E_1, A_2)$ 7.5 | |
| $B_2$ | $(A_1, B_2)$ 18.5 | $(B_1, B_2)$ 21.5 | $(C_1, B_2)$ 88 | $(D_1, B_2)$ 31 | $(E_1, B_2)$ 25 | |
| $C_2$ | $(A_1, C_2)$ 45.5 | $(B_1, C_2)$ 48.5 | $(C_1, C_2)$ 115 | $(D_1, C_2)$ 58 | $(E_1, C_2)$ 52 | |
| $D_2$ | $(A_1, D_2)$ 14.5 | $(B_1, D_2)$ 17.5 | $(C_1, D_2)$ 84 | $(D_1, D_2)$ 27 | $(E_1, D_2)$ 21 | |
| $E_2$ | $(A_1, E_2)$ 0.5 | $(B_1, E_2)$ 3.5 | $(C_1, E_2)$ 70 | $(D_1, E_2)$ 13 | $(E_1, E_2)$ 7 | |

| | $A_1$ | $B_1$ | $C_1$ | $D_1$ | $E_1$ | |
|---|---|---|---|---|---|---|
| $A_2$ | $(A_1, A_2)$ | $(B_1, A_2)$ 6.32 | $(C_1, A_2)$ 6.42 | $(D_1, A_2)$ 6.76 | $(E_1, A_2)$ 6.44 | 6.4 |
| $B_2$ | $(A_1, B_2)$ | $(B_1, B_2)$ 6.52 | $(C_1, B_2)$ 6.62 | $(D_1, B_2)$ 6.96 | $(E_1, B_2)$ 6.64 | 6.6 |
| $C_2$ | $(A_1, C_2)$ | $(B_1, C_2)$ 6.56 | $(C_1, C_2)$ 6.66 | $(D_1, C_2)$ 7 | $(E_1, C_2)$ 6.68 | 6.64 |
| $D_2$ | $(A_1, D_2)$ | $(B_1, D_2)$ 6.44 | $(C_1, D_2)$ 6.54 | $(D_1, D_2)$ 6.88 | $(E_1, D_2)$ 6.56 | 6.52 |
| $E_2$ | $(A_1, E_2)$ | $(B_1, E_2)$ 6.32 | $(C_1, E_2)$ 6.42 | $(D_1, E_2)$ 6.76 | $(E_1, E_2)$ 6.44 | 6.4 |

17

METHOD FOR MEASURING STRESS OF FERROMAGNETIC METAL MEMBER, METHOD FOR MEASURING STRESS DISTRIBUTION IN SHEET-LIKE SENSOR, AND SHEET-LIKE SENSOR FOR MEASURING STRESS DISTRIBUTION

BACKGROUND OF THE INVENTION

1. Field of the Invention

The present invention relates to a method for measuring the stress of a ferromagnetic metal member, a method for measuring the stress distribution in a sheet-like sensor, and a sheet-like sensor for measuring the stress distribution.

2. Description of the Prior Art

There is a conventionally known method for measuring the stress of a subject member by utilizing a stress-magnetism characteristic of an amorphous thin film which is a ferromagnetic metal member. In this case, a coil is used for the detection of a magnetic characteristic of the amorphous thin film (for example, see Japanese Patent Application Laid-open No.9034/83).

However, the known method suffers from a problem that the magnetic characteristic of the amorphous thin film is indirectly detected by the coil. Hence, the sensitivity is relatively low, and if the distance between the amorphous thin film and the coil is varied, the measured value is simply varied.

SUMMARY OF THE INVENTION

It is an object of the present invention to provide a relatively simple stress-measuring method of the above-described type, by which the stress information can be directly detected from the ferromagnetic metal member, thereby performing a highly sensitive and correct measurement of the stress within the ferromagnetic metal member.

To achieve the above object, according to the present invention, there is provided a method for measuring the stress of a ferromagnetic metal member, comprising the steps of: supplying an alternating current to flow across the ferromagnetic metal member to measure an impedance |Z| of the ferromagnetic metal member; and determining the stress $\sigma$ based on the measured value of the impedance |Z| and a relationship between the impedance |Z| and the stress $\sigma$ which the ferromagnetic metal member possesses.

When the alternating current is supplied to the ferromagnetic metal member as described above, the impedance |Z| or the ohmic resistance R are decreased at a high sensitivity in accordance with an increase in stress $\sigma$ in the ferromagnetic metal member.

Therefore, it is possible to correctly measure the stress $\sigma$ of the ferromagnetic metal member from the measured value of the impedance |Z| or the ohmic resistance R by previously determining the unique impedance |Z|-stress $\sigma$ relationship or the unique ohmic resistance R-stress $\sigma$ relationship possessed by the ferromagnetic metal member.

It is another object of the present invention to provide a stress distribution measuring method of the above-described type, which is capable of measuring a stress distribution in a sheet-like sensor by utilizing the above-described stress measuring method.

To achieve the above object, according to the present invention, there is provided a method for measuring the stress distribution in a sheet-like sensor, comprising the steps of: preparing a sheet-like sensor including a plurality of first ferromagnetic metal members which are arranged in parallel to one another, and a plurality of second ferromagnetic metal members which are arranged in parallel to one another to intersect the first ferromagnetic metal members and which are electrically insulated from the first ferromagnetic metal members; supplying an alternating current to flow across each of the first and second ferromagnetic metal members while a load is being applied to the sensor from one of its flats, thereby measuring an impedance |Z| of each of the first and second ferromagnetic metal members; determining a stress $\sigma$ of each of the first and second ferromagnetic metal members, based on the measured value of the impedance |Z| from a relationship between the impedance |Z| and the stress $\sigma$ which each of the first and second ferromagnetic metal members possesses, and then determining the sum of the stresses $\sigma$ of the first and second ferromagnetic metal members which are in a mutually intersecting relation to define the sum of the stresses $\sigma$ as a stress $\sigma$ at a phantom intersection of the first and second ferromagnetic metal members.

When the alternating current is supplied to the first and second ferromagnetic metal members, as described above, the impedance |Z| and the ohmic resistance R are decreased with an increase in stress $\sigma$ in each of the first and second ferromagnetic metal members.

Therefore, it is possible to correctly measure the stress $\sigma$ of each of the first and second ferromagnetic metal members from the measured value of the impedance |Z| or the ohmic resistance R by previously determining the unique impedance |Z|-stress $\sigma$ relationship or the unique ohmic resistance R-stress $\sigma$ relationship possessed by each of the ferromagnetic metal members. If the sum of the stresses $\sigma$ is defined as the stress $\sigma$ at the phantom intersection, as described above, the stress $\sigma$ at each of the phantom intersections corresponds to a load applied to such phantom intersection, whereby a stress distribution in the sheet-like sensor can be measured.

It is a further object of the present invention to provide a sheet-like sensor of the above-described type, which is capable of easily measuring a stress distribution.

To achieve the above object, according to the present invention, there is provided a sheet-like sensor for measuring a stress distribution, comprising, a plurality of first ferromagnetic metal members which are arranged in parallel to one another and subjected to the measurement of one of an impedance |Z| and an ohmic resistance R; and a plurality of second ferromagnetic metal members which are arranged in parallel to one another to intersect the first ferromagnetic metal members and are electrically insulated from the first ferromagnetic metal members, and which are used for measuring one of the impedance |Z | and the ohmic resistance R, the sum of stresses $\sigma$ of the first and second ferromagnetic metal members which are in a mutually intersecting relation being defined as a stress $\sigma$ at a phantom intersection of the first and second ferromagnetic metal members.

Thus, it is possible to easily perform the measurement of the stress distribution by the sheet-like sensor.

The above and other objects, features and advantages of the invention will become apparent from the following description of preferred embodiments taken in conjunction with the accompanying drawings.

BRIEF DESCRIPTION OF THE DRAWINGS

FIG. 26 is a schematic diagram illustrating a first example of a stress distribution;

FIG. 27 is a schematic diagram illustrating a second example of a stress distribution;

FIG. 30 is a schematic diagram illustrating a first example of a stress distribution.

DESCRIPTION OF THE PREFERRED EMBODIMENTS

Embodiment I

Example 1

Figure 1:
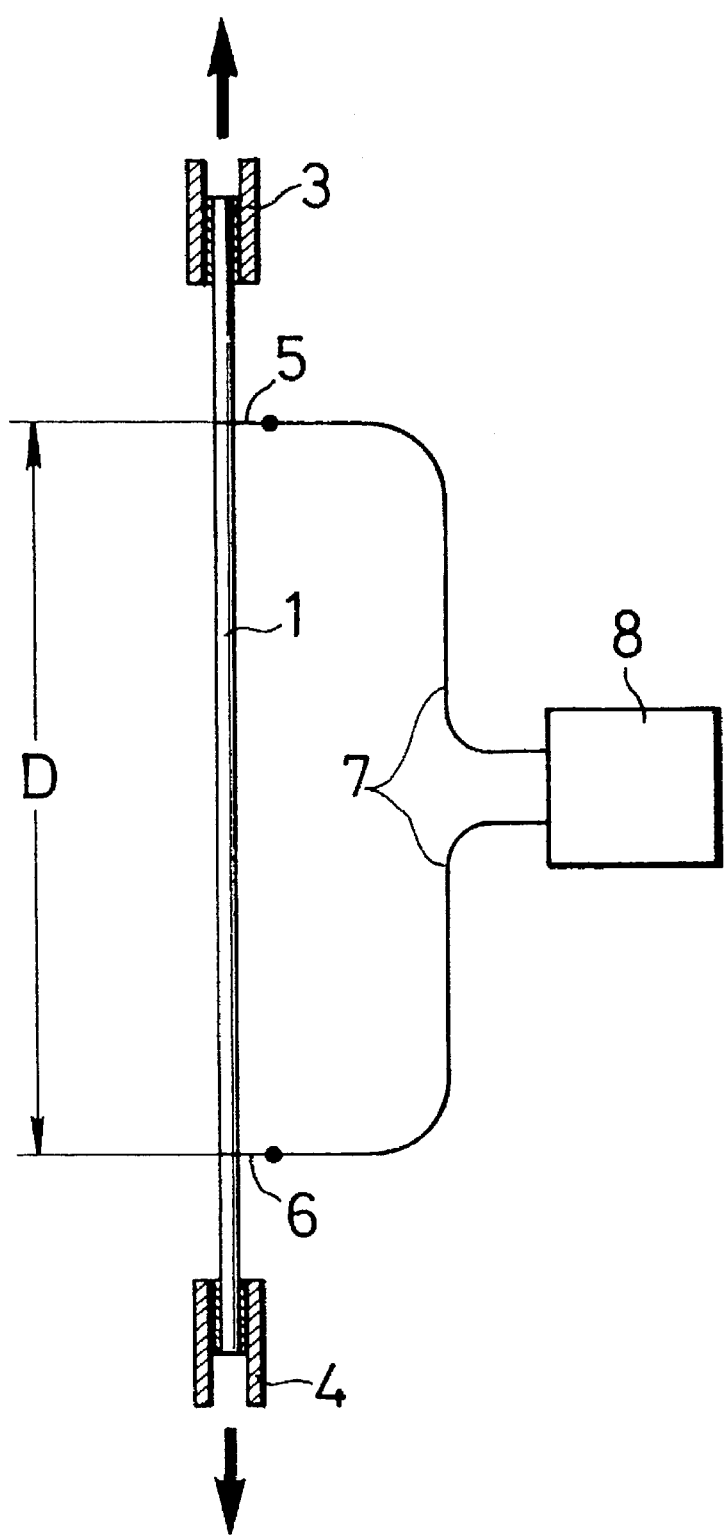
FIG. 1 is a schematic view for explaining a first embodiment of a stress measuring method.
Figure 2:
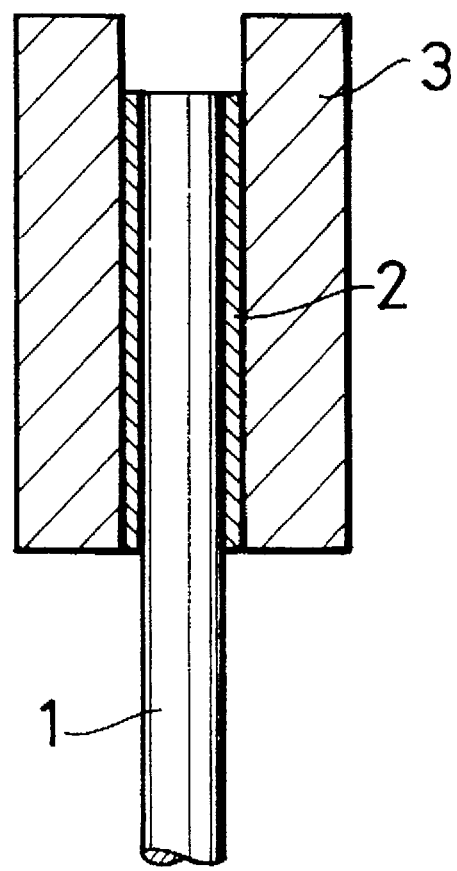
FIG. 2 is an enlarged view of an essential portion shown in FIG. 1.

A. Referring to FIGS. 1 and 2, a ferromagnetic linear metal member 1 was selected which was made of an amorphous iron-based alloy having a composition of $Fe_{77.5}Si_{7.5}B_{15}$ (each numerical value represents atom %) and which had a diameter of 125 μm and a length of 200 mm. This amorphous iron-based alloy has a positive magnetostriction λs (i.e., λs>0). Both ends of the linear metal member 1 were clamped between a pair of chucks 3, 4 of a tensile tester with an abrasive paper 2 (#360) interposed therebetween, which paper 2 had a high friction coefficient and an electrically insulating property.

A pair of terminals 5 and 6 were mounted to the linear metal member 1, so that the distance D between the terminals became 150 mm, and an impedance analyzer (made under a trade name of 4192A by YHP Corp.) 8 including an A.C. power supply was connected to both terminals 5 and 6 through a 4-terminal cable 7. This impedance analyzer 8 enables an impedance |Z| and an ohmic resistance R to be measured from a relation of $|Z|=\{R^2+(\omega L-1/\omega C)^2\}$, wherein ωL represents the inductive reactance, and 1/ωC represents the capacitive reactance.

Then, a tensile load was applied to the linear metal member 1 at room temperature, and an alternating current having a frequency f equal to 10 MHz, 1 MHz or 100 kHz at a voltage of 1 V was supplied to flow across the linear metal member to measure the impedance |Z| and an ohmic resistance R between the terminals 5 and 6 by utilizing a 4-terminal process.

In the measurement, the tensile load on the linear metal member 1 was varied in a range of 0 to 2 kg f, so that the stress σ in the linear metal member 1 was varied in a range of 0 to about 163 kg f/mm².

Figure 3:
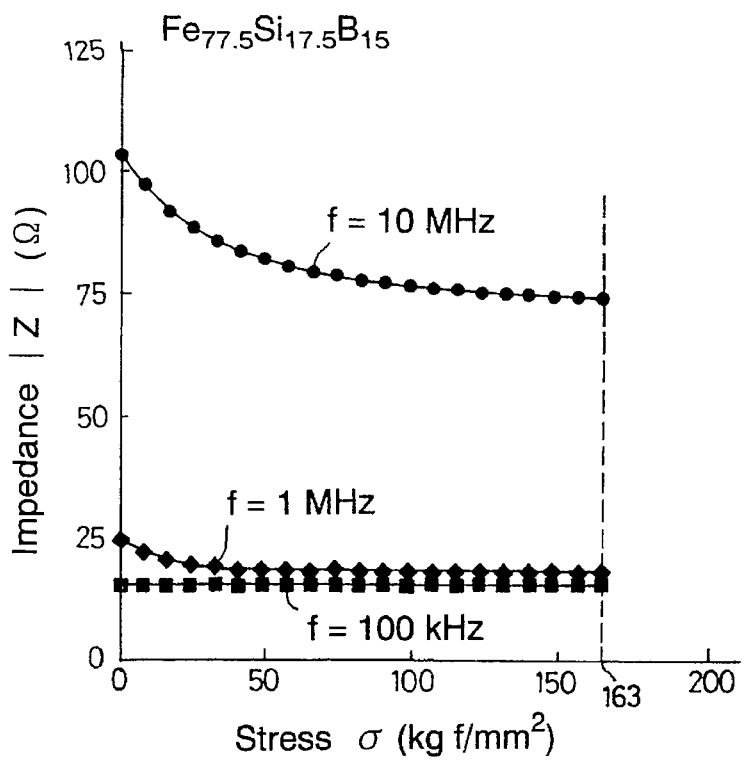
FIG. 3 is a graph illustrating a first example of the relationship between the stress σ and the impedance |Z|.
Figure 4:
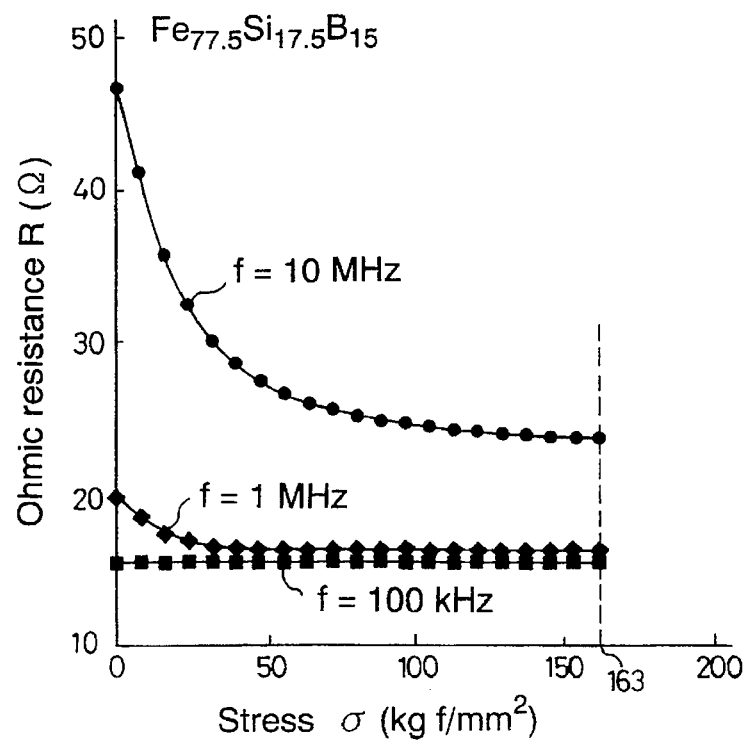
FIG. 4 is a graph illustrating a first example of the relationship between the stress σ and the ohmic resistance R.

FIGS. 3 and 4 show results of the measurement. FIG. 3 shows the relationship between the stress σ and the impedance |Z|, and FIG. 4 shows the relationship between the stress σ and the measured value of the ohmic resistance R.

As apparent from FIGS. 3 and 4, if the frequency f of the alternating current is set at 10 MHz, the impedance |Z| and the ohmic resistance R are reduced with an increase in stress σ. When the frequency is 1 MHz, the reduction in impedance |Z| and the like is slow.

It is evident from the above fact that the impedance |Z| and the ohmic resistance R between the terminals 5 and 6 can be measured to correctly measure a stress σ in the linear metal member 1 based on the measured values of the impedance |Z| and the ohmic resistance R from the unique relationship of impedance |Z|-stress σ, or of ohmic resistance R-stress σ possessed by the linear metal member 1.

However, when the frequency f of the alternating current is equal to 100 kHz, even if the stress σ is increased, the impedance |Z| and the ohmic resistance R are little varied.

In the case of a linear metal member exhibiting no ferromagnetism such as Cu, JIS SUS304, measurement results as shown in FIGS. 3 and 4 were not obtained.

B. As shown in FIG. 1, a linear metal member 1 made of an amorphous iron-based alloy having the same composition and the same size as those described above was likewise clamped between the pair of chucks 3, 4 of the tensile tester. The pair of terminals 5 and 6 are likewise mounted to the linear metal member 1 at the same terminal-terminal distance D, and further, the impedance analyzer 8 was likewise connected to both terminals 5 and 6.

First, in a condition in which the stress σ in the linear metal member 1 was equal to 0 kg f/mm² (tensile load of 0 kg f), an alternating current was supplied to flow across the linear metal member 1, so that the frequency f was varied in a range of 1 to 14 MHz at a voltage of 1 V, thereby measuring an impedance |Z| and an ohmic resistance R between both the terminals 5 and 6 by utilizing a 4-terminal process.

Then, in a condition in which the stress σ in the linear metal member 1 was equal to 40 kg f/mm² (tensile load of 0.5 kg f), an alternating current was supplied to flow across the linear metal member 1, so that the frequency f was varied in a range of 1 to 13 MHz at a voltage of 1 V, thereby measuring an impedance |Z| and an ohmic resistance R between the terminals 5 and 6 by utilizing a 4-terminal process.

Figure 5:
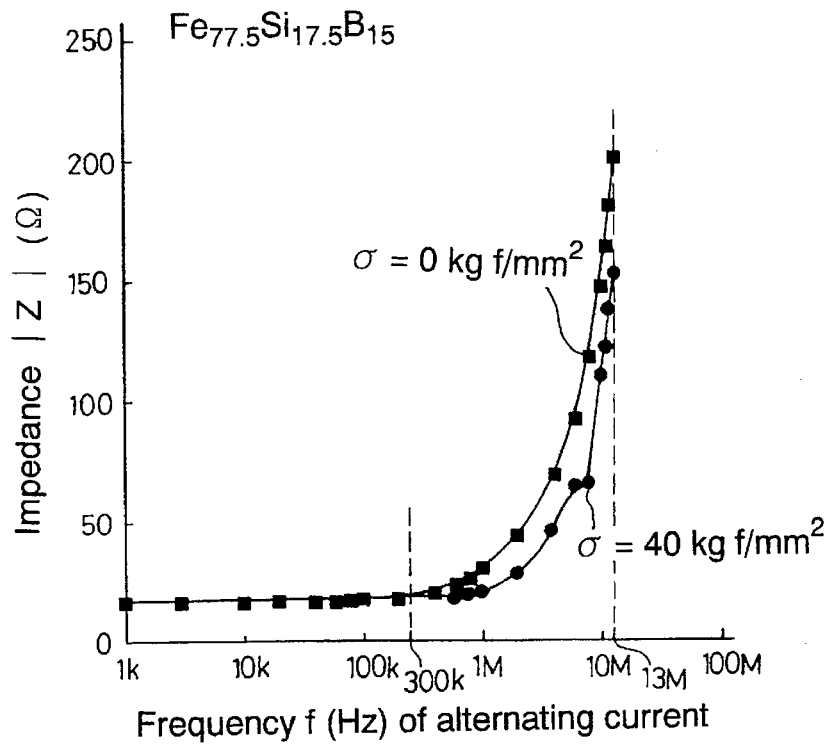
FIG. 5 is a graph illustrating the relationship between the frequency f of an alternating current and the impedance |Z|.
Figure 6:
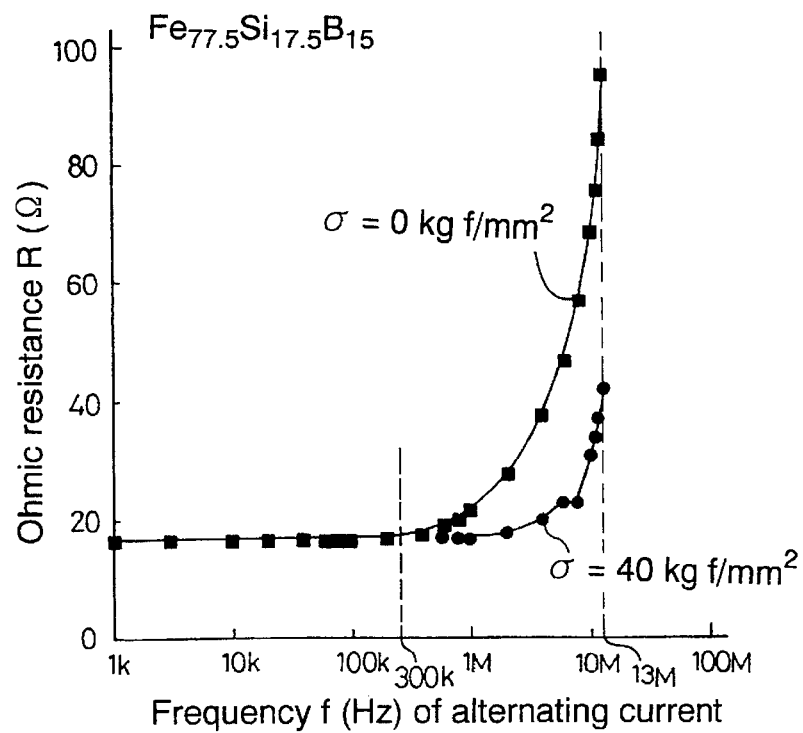
FIG. 6 is a graph illustrating the relationship between the frequency f of the alternating current and the ohmic resistance R.

FIGS. 5 and 6 show results of the measurement. FIG. 5 shows the relationship between the frequency f of the alternating current and the measured value of the impedance |Z|, and FIG. 6 shows the relationship between the frequency f of the alternating current and the measured value of the ohmic resistance R.

In FIG. 5, a difference is produced between the impedance |Z| provided when the stress σ is equal to 0 kg f/mm² and the impedance |Z| provided when the stress σ is equal to 40 kg f/mm² in a region in which the frequency f of the alternating current is equal to or larger than 300 kHz. Therefore, in the measurement of the stress in the linear metal member 1 made of the amorphous iron-based alloy, it is necessary to set the frequency f of the alternating current in a range of f≧300 kHz. This also applies to the ohmic resistance R shown in FIG. 6.

Figure 7:
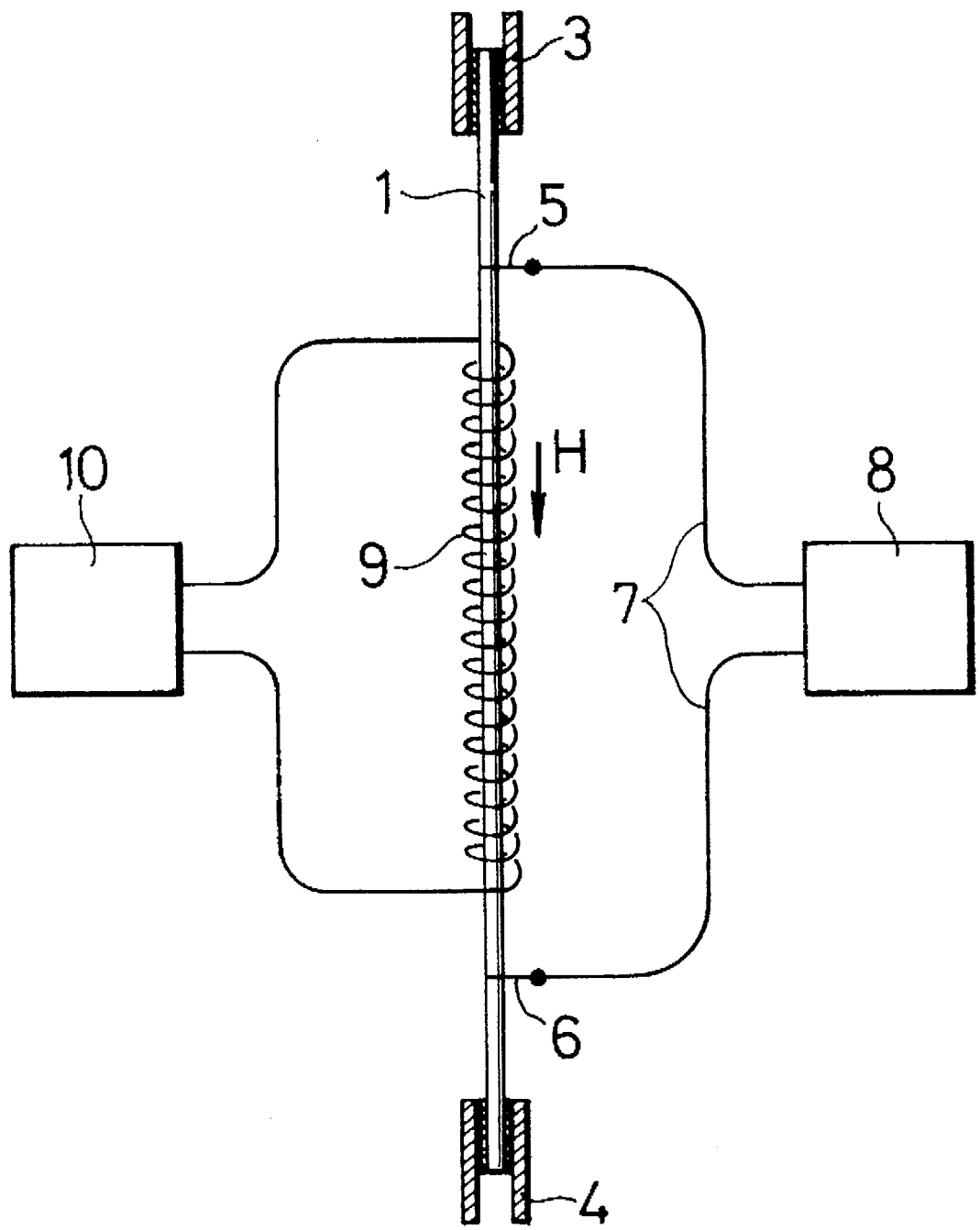
FIG. 7 is a schematic view for explaining a second embodiment of a stress measuring method.

C. As shown in FIG. 7, a linear metal member 1 of an amorphous iron-based alloy having the same composition and the same size as those described above was likewise clamped between the pair of chucks 3, 4 of the tensile tester. The pair of terminals 5 and 6 are likewise mounted to the linear metal member 1 at the same terminal-terminal distance D, and further, the impedance analyzer 8 was likewise connected to both terminals 5 and 6. In this case, a portion of the linear metal member 1 located between both the terminals 5 and 6 was inserted through the solenoid 9.

The solenoid 9 provides an axially-directed external magnetic field H to the linear metal member 1, and is connected to a D.C. power supply 10. The number of turns of the solenoid 9 is 3375 turns/m, and the length of the solenoid 9 is of 120 mm.

In a condition in which the stress σ in the linear metal member 1 was equal to 0 kg f/mm² (tensile load of 0 kg f), an alternating current having a frequency f of 10 Mhz or 1 Mhz at a voltage of 1 V was supplied to flow across the linear metal member 1, and the external magnetic field H was varied in a range of 0 to 3400 A/m, thereby measuring an impedance |Z| and an ohmic resistance R between the terminals 5 and 6 by utilizing a 4-terminal process.

Figure 8:
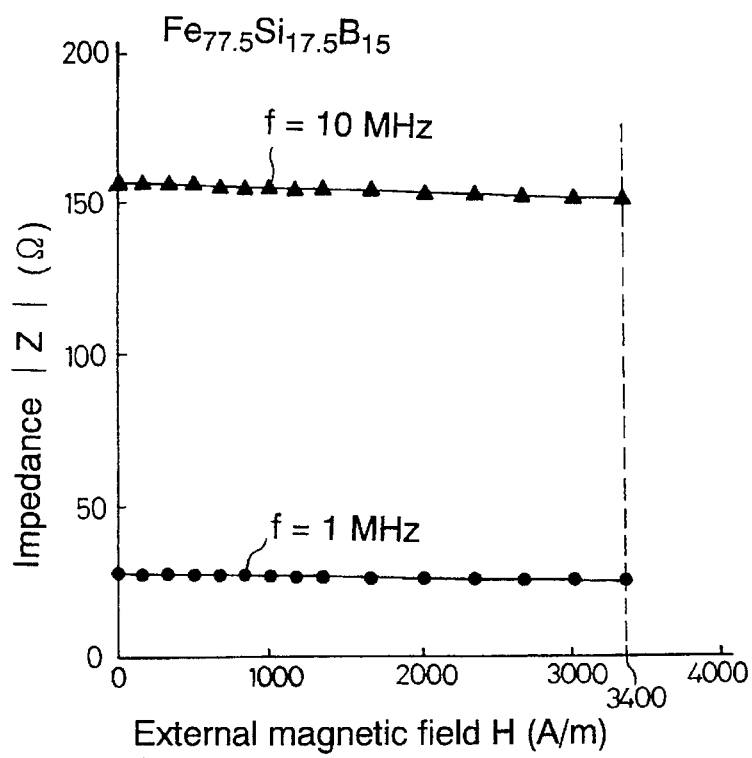
FIG. 8 is a graph illustrating a first example of the relationship between the external magnetic field H and the impedance |Z|.
Figure 9:
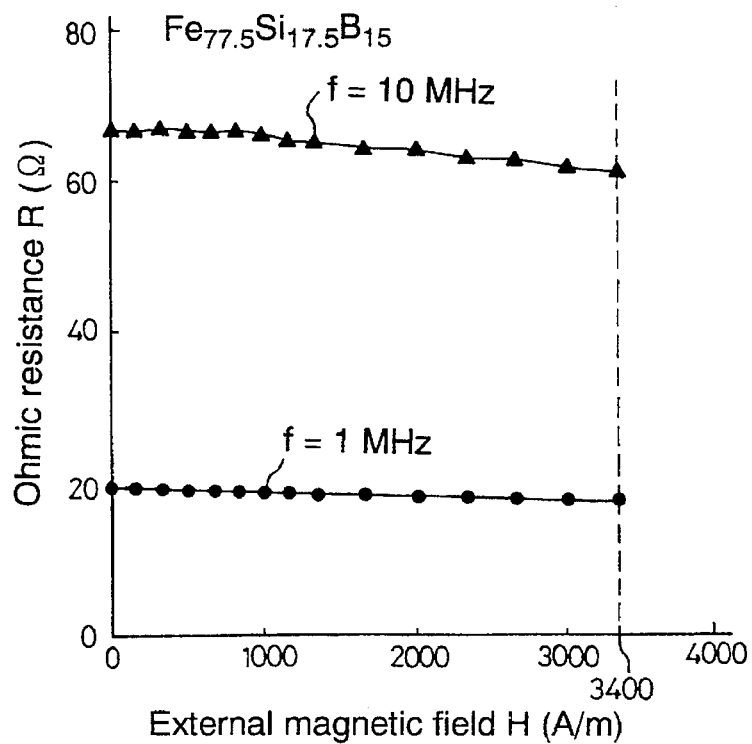
FIG. 9 is a graph illustrating a first example of the relationship between the external magnetic field H and the ohmic resistance R.

FIGS. 8 and 9 show results of the measurement. FIG. 8 shows the relationship between the external magnetic field H and the measured value of the impedance |Z|, and FIG. 9 shows the relationship between the external magnetic field H and the measured value of the ohmic resistance R.

From FIGS. 8 and 9, it can be seen that the measured values of the impedance |Z| and the ohmic resistance R for the linear metal member 1 are little varied, even if the external magnetic field H is as high as 3400 A/m, and therefore, such measured values are little influenced by a disturbance such as a floating magnetic field. This is attributable to the fact that it is difficult for the linear metal member 1 to be magnetized, because the amorphous iron-based alloy forming the linear metal member 1 has a positive magnetostriction λs.

Figure 10:
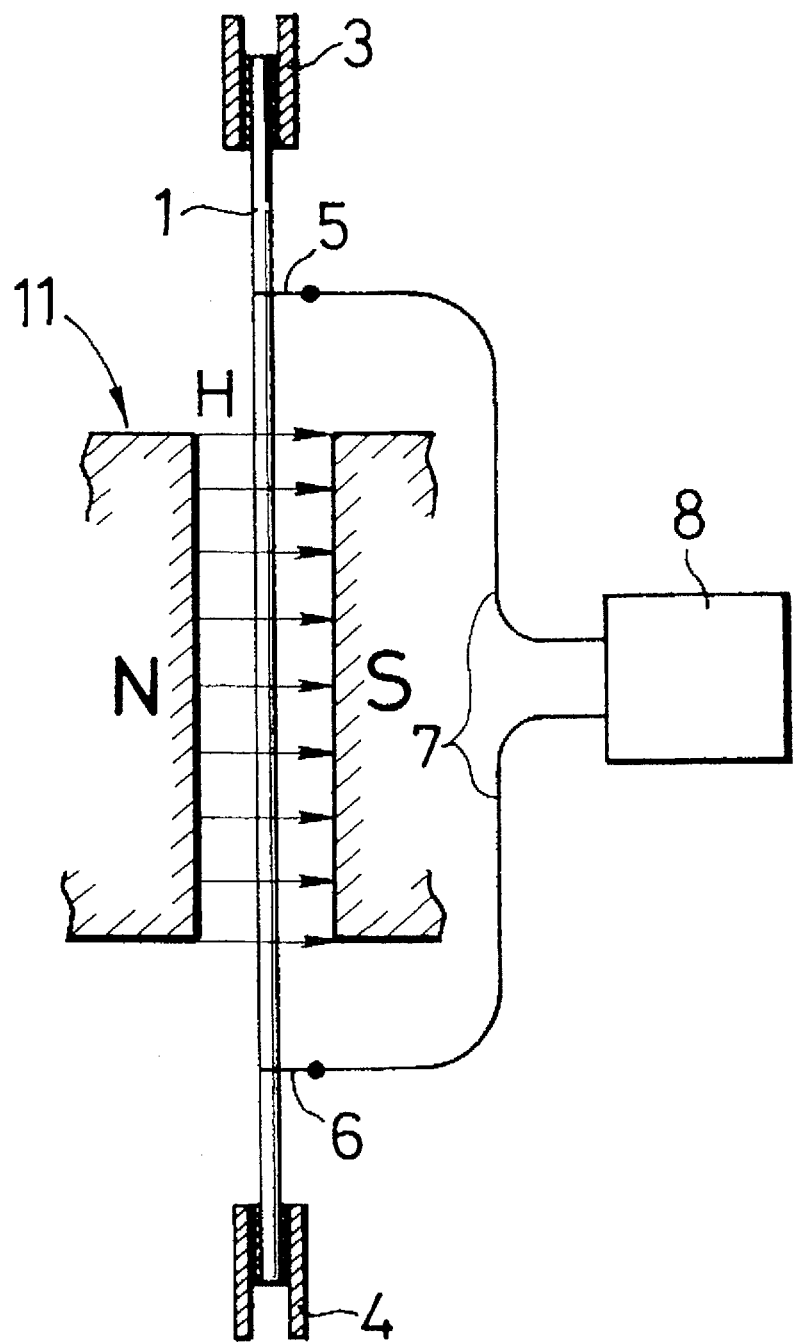
FIG. 10 is a schematic view for explaining a third embodiment of a stress measuring method.

D. As shown in FIG. 10, a linear metal member 1 of an amorphous iron-based alloy having the same composition and the same size as those described above was likewise clamped between the pair of chucks 3, 4 of the tensile tester. The pair of terminals 5 and 6 are likewise mounted to the linear metal member 1 at the same terminal-terminal distance D, and further, the impedance analyzer 8 was likewise connected to both terminals 5 and 6. In this case, N and S poles of an electromagnet 11 were disposed on opposite sides of a portion of the linear metal member 1 located between the terminals 5 and 6, respectively.

The electromagnet 11 provides, to the linear metal member 1, an external magnetic field H in a direction perpendicular to an axis of the linear metal member 1, and has a double-yoke type coil. The diameter of tip ends of the N and S poles is 80 mm, and the gap between the N and S poles is 42 mm. The yoke is made of pure iron.

Figure 11:
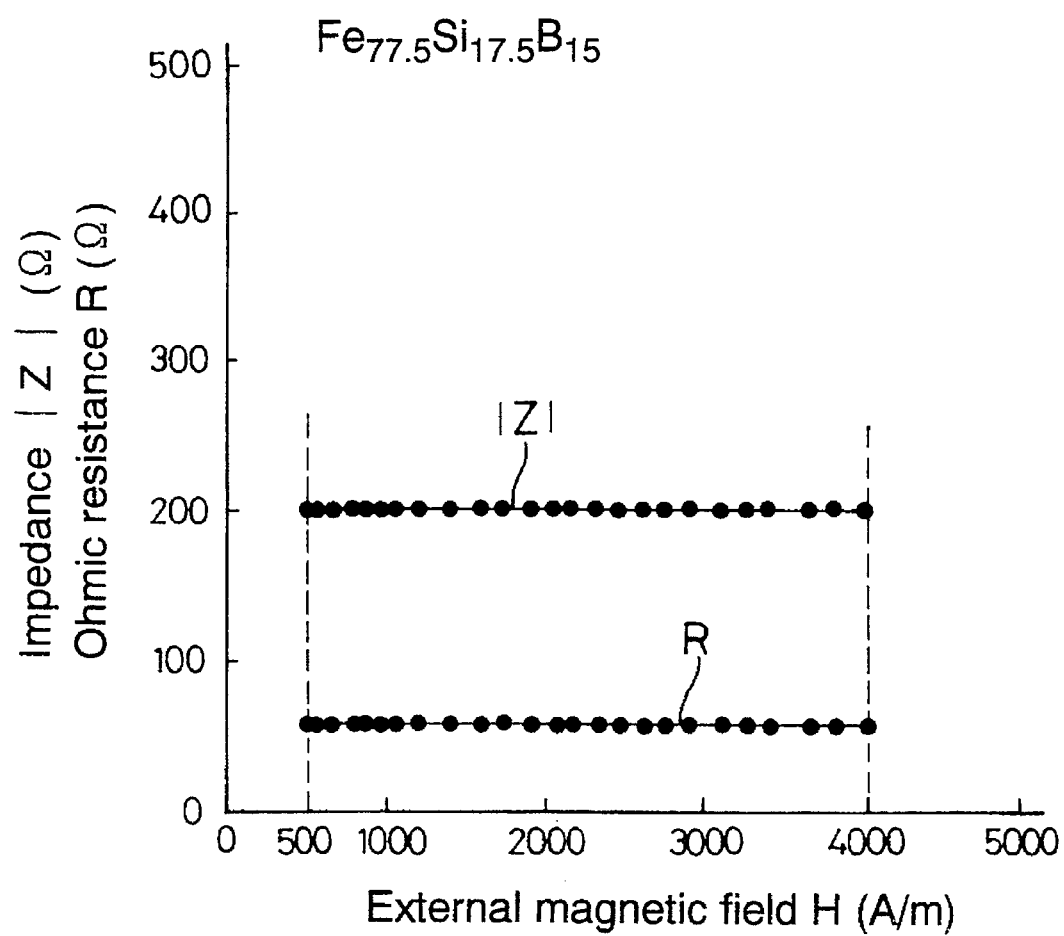
FIG. 11 is a graph illustrating a first example of the relationship between the external magnetic field H and the impedance |Z| as well as the ohmic resistance R.

In a condition in which the stress σ in the linear metal member 1 was equal to 0 kg f/mm² (tensile load of 0 kg f), an alternating current having a frequency f of 10 MHz at a voltage of 1 V was supplied to flow across the linear metal member 1, and an external magnetic field H was varied in a range of 500 to 4000 A/m, thereby measuring an impedance |Z| and an ohmic resistance R between the terminals 5 and 6 by utilizing a 4-terminal process to provide the results shown in FIG. 11.

From FIG. 11, it can be seen that the measured values of the impedance |Z| and the ohmic resistance R for the linear metal member 1 are little varied, even if the external magnetic field H is as high as 4000 A/m, and therefore, such measured values are little influenced by a disturbance. This is attributable to the above-described reason.

If the linear metal member 1 is formed from the amorphous iron-based alloy as described in items C and D, the measured values of the impedance |Z| and the ohmic resistance R are little influenced by external magnetic fields. Hence, shielding for magnetism is not required in the measurement of the impedance |Z|. Thus, in constructing a system using the linear metal member 1, it is possible to provide a reduction in size and a simplification of the system.

Example 2

A ferromagnetic linear metal member 1 made of iron with a purity of 99.98% and having a diameter of 100 μm and a length of 200 mm was selected.

As shown in FIG. 1, the linear metal member 1 was clamped between the pair of chucks 3, 4 of the tensile tester as in Example 1. A pair of terminals 5 and 6 were mounted to the linear metal member 1 at the same terminal-terminal distance D as in Example 1, and further, the impedance analyzer 8 was connected to both terminals 5 and 6 as in Example 1.

Then, a tensile load was applied to the linear metal member 1 at room temperature, and an alternating current having a frequency f of 10 MHz or 100 kHz at a voltage of 1 V was supplied to flow across the linear metal member 1, thereby measuring an impedance |Z| and an ohmic resistance R between the terminals 5 and 6 by utilizing a 4-terminal process.

In the measurement, the tensile load was varied in a range of 0 to 0.5 kg f, so that the stress σ in the linear metal member 1 was varied in a range of 0 to about 64 kg f/mm².

Figure 12:
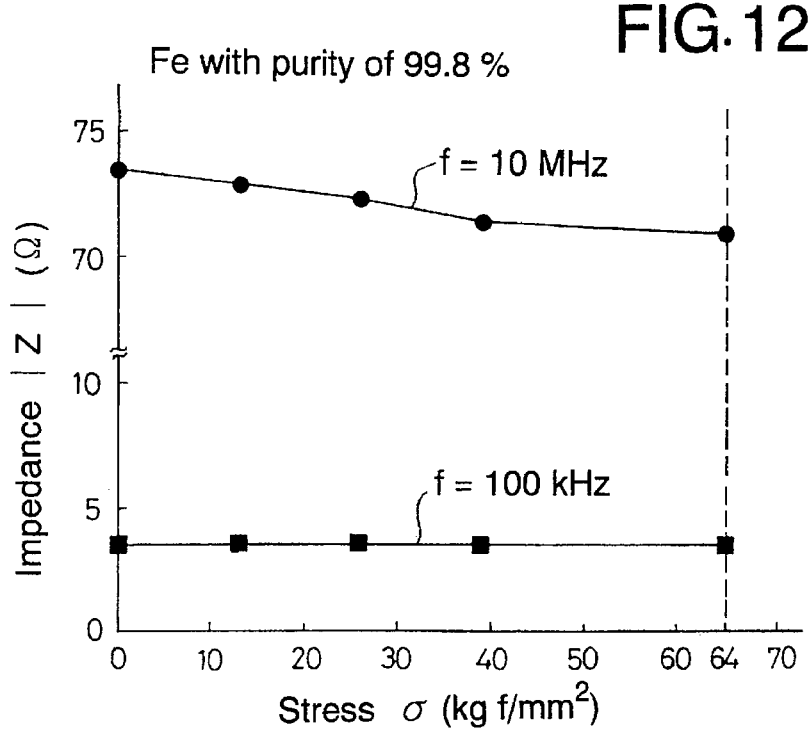
FIG. 12 is a graph illustrating a second example of the relationship between the stress σ and the impedance |Z|.
Figure 13:
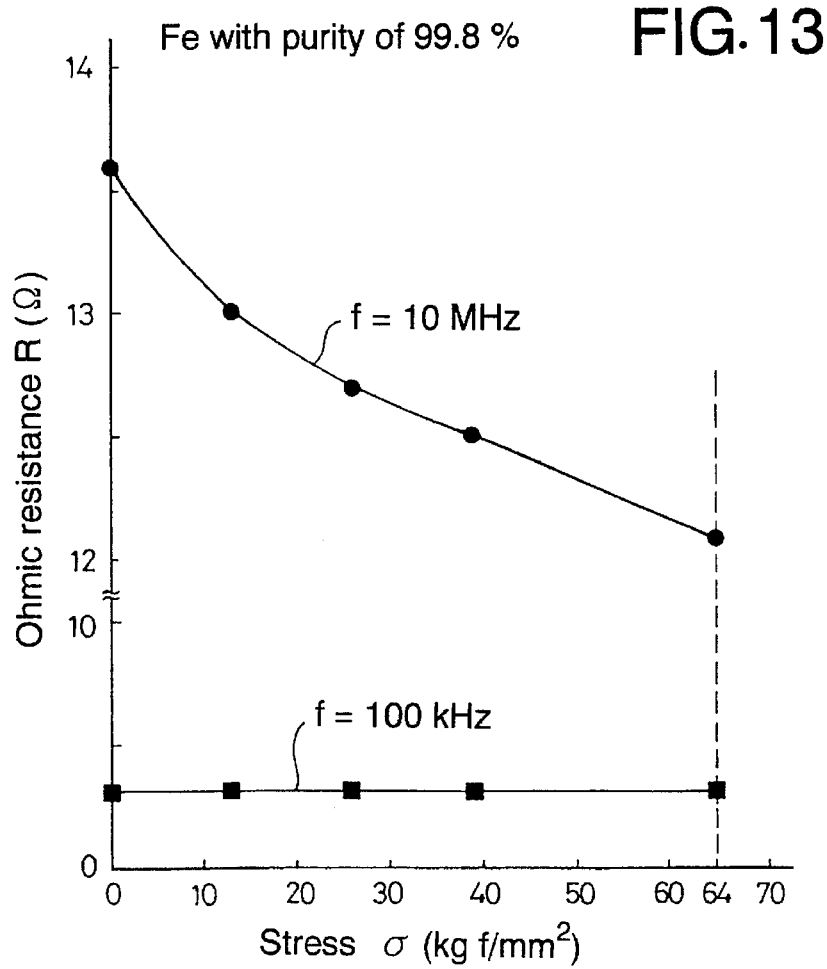
FIG. 13 is a graph illustrating a second example of the relationship between the stress σ and the ohmic resistance R.

FIGS. 12 and 13 show results of the measurement. FIG. 12 shows the relationship between the stress σ and the measured value of the impedance |Z|, and FIG. 13 shows the relationship between the stress σ and the measured value of the ohmic resistance R.

As apparent from FIGS. 12 and 13, if the frequency of the alternating current is set at 10 MHz, the impedance |Z| and the ohmic resistance R are decreased with an increase in stress σ. However, when the frequency f of the alternating current is equal to 100 kHz, the impedance |Z| and the like are not varied.

Example 3

A. A ferromagnetic linear metal member 1 made of an amorphous cobalt-based alloy of a composition of $(Fe_{0.06}Co_{0.94})_{72.5}Si_{12.5}B_{15}$ (each numerical value is atom %) and having a diameter of 135 μm and a length of 200 mm was selected. The magnetostriction λs of this amorphous cobalt-based alloy is nearly equal to 0 (zero).

As shown in FIG. 1, the linear metal member 1 was clamped between the pair of chucks 3, 4 of the tensile tester as in Example 1. A pair of terminals 5 and 6 were mounted to the linear metal member 1 at the same terminal-terminal distance D as in Example 1, and further, the impedance analyzer 8 was connected to both the terminals 5 and 6, as in Example 1.

Then, a tensile load was applied to linear metal member 1 at room temperature, and an alternating current having a frequency f of 10 MHz, 1 MHz or 100 kHz at a voltage of 1 V was supplied to flow across the linear metal member 1, thereby measuring an impedance |Z| and an ohmic resistance R between the terminals 5 and 6 by utilizing a 4-terminal process.

In the measurement, the tensile load was varied in a range of 0 to 2 kg f, so that the stress σ in the linear metal member 1 was varied in a range of 0 to about 140 kg f/mm².

Figure 14:
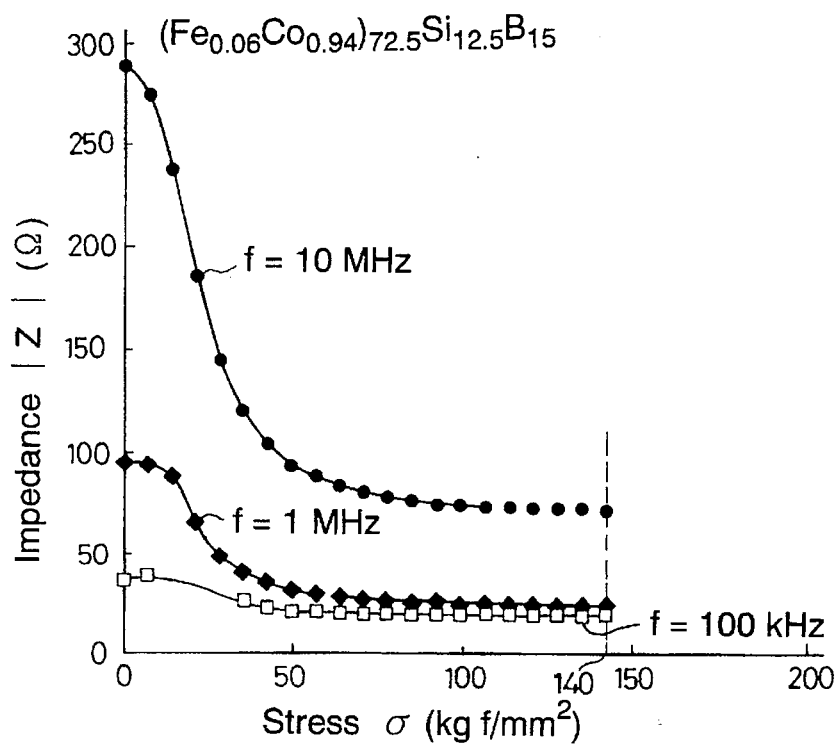
FIG. 14 is a graph illustrating a third example of the relationship between the stress σ and the impedance |Z|.
Figure 15:
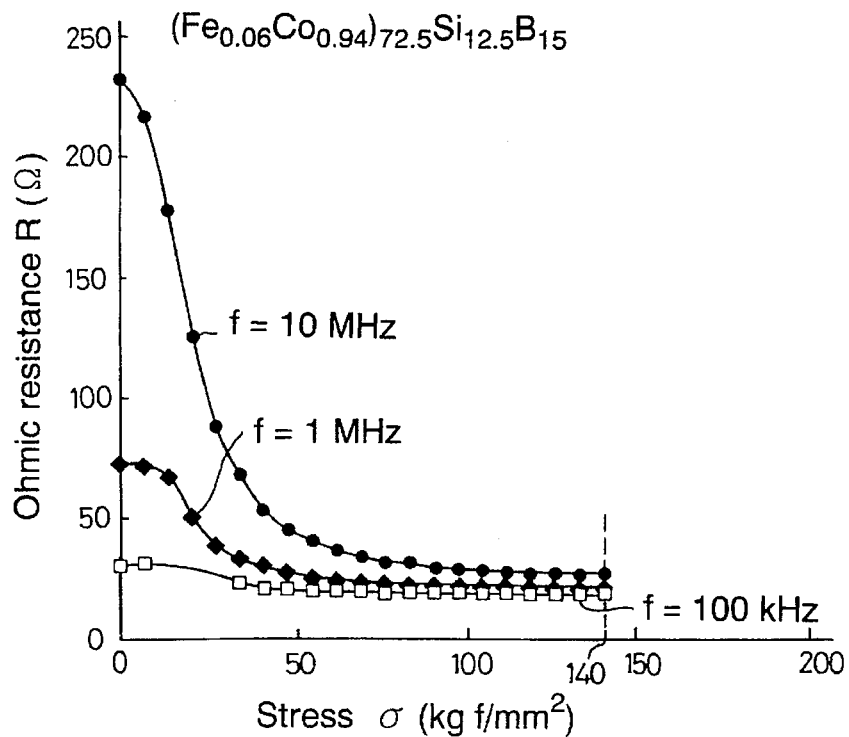
FIG. 15 is a graph illustrating a third example of the relationship between the stress σ and the ohmic resistance R.

FIGS. 14 and 15 show results of the measurement. FIG. 14 shows the relationship between the stress σ and the measured value of the impedance |Z|, and FIG. 15 shows the relationship between the stress σ and the measured value of the ohmic resistance R.

As apparent from FIGS. 14 and 15, the impedance |Z| and the ohmic resistance R are decreased with an increase in stress σ at the frequency of the alternating current equal to 10 MHz, 1 MHz and 100 kHz.

B. As shown in FIG. 7, a linear metal member 1 of an amorphous cobalt-based alloy having the same composition and the same size as those described above in Example 3A was clamped between the pair of chucks 3, 4 of the tensile tester. The pair of terminals 5 and 6 were likewise mounted to the linear metal member 1 at the same terminal-terminal distance D as that described above, and further, the impedance analyzer 8 was likewise connected to both terminals 5 and 6. In this case, a portion of the linear metal member 1 located between the terminals 5 and 6 was inserted through the solenoid 9.

The solenoid 9 provides an axially-directed external magnetic field H to the linear metal member 1, as in Example 1 and is connected to a D.C. power supply 10. The number of turns of the solenoid 9 is 3375 turns/m, and the length of the solenoid 9 is 120 mm.

In a condition in which the stress σ in the linear metal member 1 was equal to 0 kg f/mm² (tensile load of 0 kg f), an alternating current having a frequency f equal to 10 MHz, 1 MHz or 100 kHz at a voltage of 1 V was supplied to flow across the linear metal member 1, and an external magnetic field H was varied in a range of 15 to 666 A/m, thereby measuring an impedance |Z| and an ohmic resistance R between the terminals 5 and 6 by utilizing a 4-terminal process.

Figure 16:
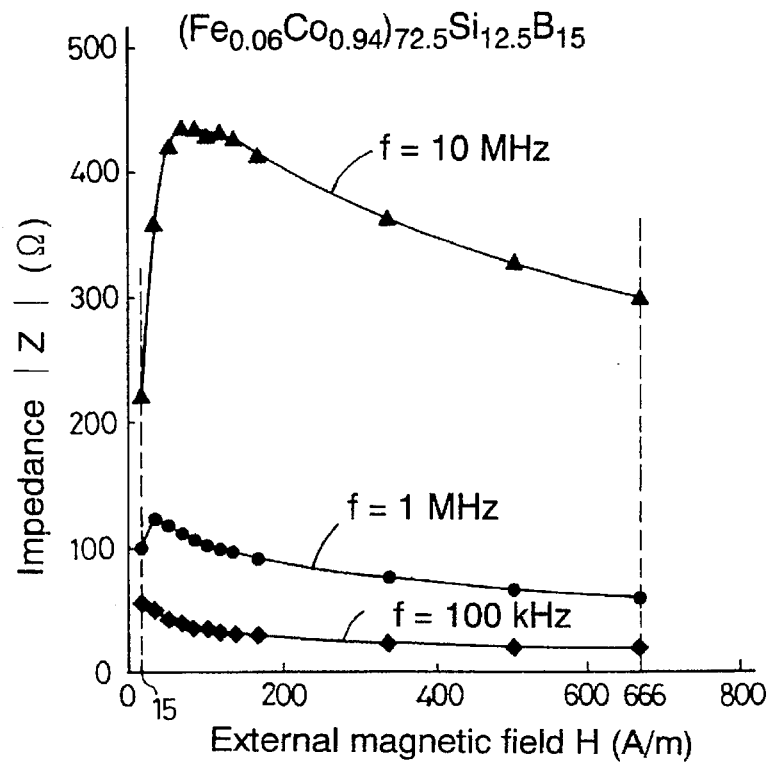
FIG. 16 is a graph illustrating a second example of the relationship between the external magnetic field H and the impedance |Z|.
Figure 17:
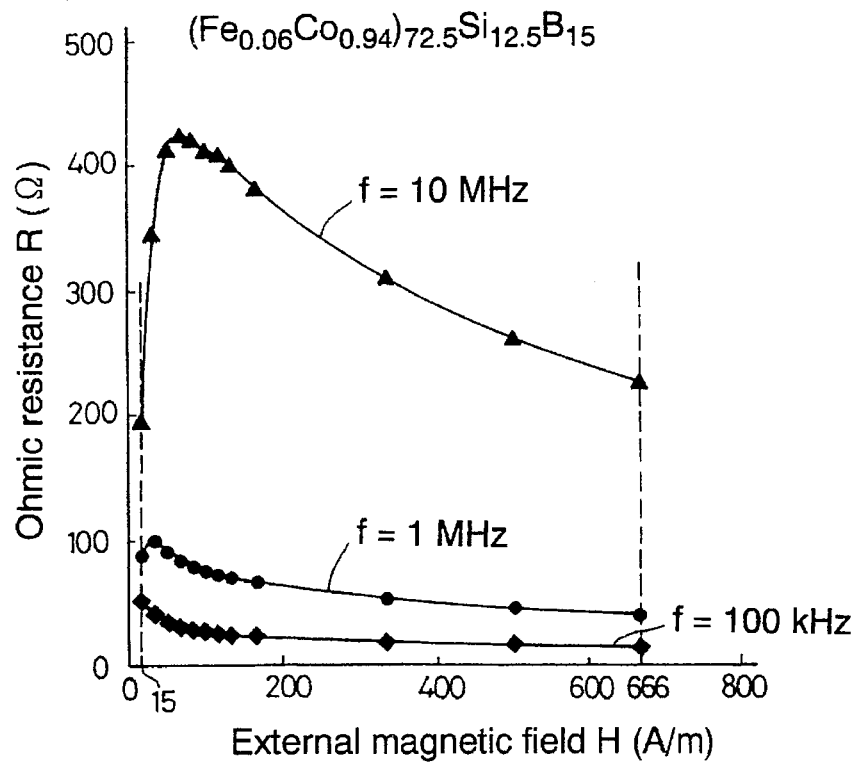
FIG. 17 is a graph illustrating a second example of the relationship between the external magnetic field H and the ohmic resistance R.

FIGS. 16 and 17 show results of the measurement. FIG. 16 shows the relationship between the external magnetic field H and the measured value of the impedance |Z|, and FIG. 17 shows the relationship between the external magnetic field H and the measured value of the ohmic resistance R.

From FIGS. 16 and 17, it can be seen that the measured values of the impedance |Z| and the ohmic resistance R for the linear metal member 1 vary significantly under influence of the external magnetic field. This is attributable to the fact that the linear metal member 1 is easily magnetized, because the amorphous cobalt-based alloy forming the linear metal member 1 has a positive magnetostriction λs nearly equal to 0 (zero).

C. As shown in FIG. 10, a linear metal member 1 of an amorphous cobalt-based alloy having the same composition and the same size as those described above in Example 3A was likewise clamped between the pair of chucks 3, 4 of the tensile tester. The pair of terminals 5 and 6 are likewise mounted to the linear metal member 1 at the same terminal-terminal distance D, and further, the impedance analyzer 8 was likewise connected to both terminals 5 and 6. In this case, N and S poles of an electromagnet 11 were disposed on opposite sides of a portion of the linear metal member 1 located between the terminals 5 and 6.

The electromagnet 11 provides, to the linear metal member 1, an external magnetic field H in a direction perpendicular to the axis of the linear metal member 1, and is constructed in the same manner as described above.

Figure 18:
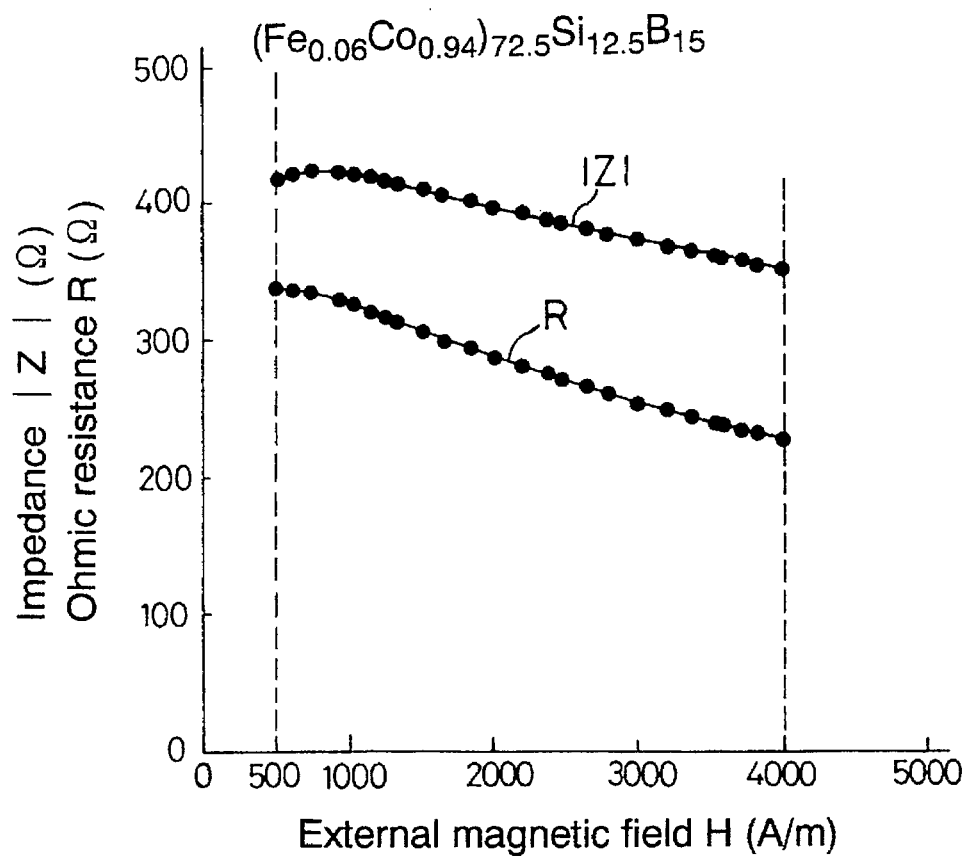
FIG. 18 is a graph illustrating a second example of the relationship between the external magnetic field H and the impedance |Z| as well as the ohmic resistance R.

In a condition in which the stress σ in the linear metal member 1 was equal to 0 kg f/mm² (tensile load of 0 kg f), an alternating current having a frequency f of 10 MHz at a voltage of 1 V was supplied to flow across the linear metal member 1, and an external magnetic field H was varied in a range of 500 to 4000 A/m, thereby measuring an impedance |Z| and an ohmic resistance R between the terminals 5 and 6 by utilizing a 4-terminal process to provide the results shown in FIG. 18.

From FIG. 18, it can be seen that the measured values of the impedance |Z| and the ohmic resistance R for the linear metal member 1 vary significantly under influence of the external magnetic field H. This is attributable to the above-described reason.

If the foregoing points are taken into consideration, the measurement of the stress in the linear metal member 1 made of the amorphous cobalt-based alloy is required to be carried out in environments free of a disturbance such as an external magnetic field H, or to be carried out using a magnetism shielding means.

If the linear metal member 1 is formed from an amorphous iron-based alloy, an amorphous cobalt-based alloy or the like, the yield stress (resilience limit) of the linear metal member 1 can be enhanced, and thus, it is possible to measure a repeated stress, or a stress causing a large strain, or the like in the linear metal member.

The measurement of the stress cannot be performed by a strain gauge, because the resistor wire within the strain gauge is fatigued due to the repeated stress or the like.

Figure 19:
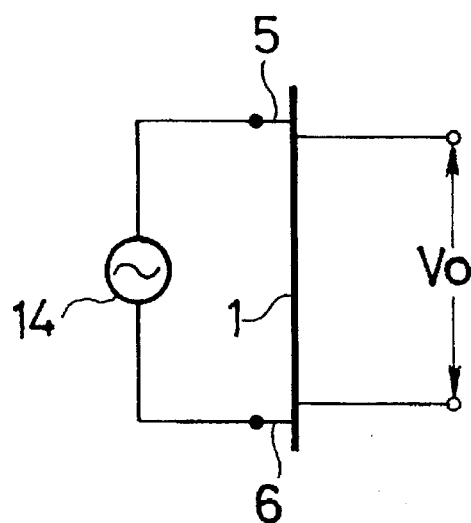
FIG. 19 is a schematic illustration of an electric circuit in one example of a stress measuring system.

FIG. 19 shows one example of a stress measuring apparatus. In this apparatus, an A.C. power supply 14 is connected between terminals 5 and 6 of the linear metal member 1, and A.C. outputs including an impedance |Z| and an ohmic resistance R of the linear metal member 1 are obtained between the terminals 5 and 6.

The above-described Example 1 is utilized, for example, for the detection of a small internal damage of an FRP member. More specifically, a plurality of linear metal members 1 are embedded into the FRP member and held by a plastic matrix in a state in which an external force has been applied thereto. If hair-like cracks are produced in the plastic matrix within the FRP member, or an interfacial peel-off is produced between the plastic matrix and the linear metal member 1, the holding force of the plastic matrix on the linear metal member 1 and thus the external force initially applied to the linear metal member 1 are reduced and hence, the stress of the linear metal member 1 is also reduced with the reduction in the holding force and the like. Thus, the small internal damage of the FRP member can be detected.

Embodiment II

Example 1

A ferromagnetic linear metal member 1 was selected which was made of an amorphous iron-based alloy having a composition of $Fe_{77.5}Si_{7.5}B_{15}$ (each numerical value represents atom %) and which had a diameter of 125 μm and a length of 550 mm. This linear metal member 1 was made from the same material and had the same diameter as the member described in item A of Example 1 in embodiment I. As shown in FIGS. 1 and 2, each end of the linear metal member 1 was clamped between a pair of chucks 3, 4 of a tensile tester in the same manner as that described above.

A pair of terminals 5 and 6 were mounted to the linear metal member 1, so that the distance D between the terminals was equal to 500 mm, and both terminals 5 and 6 were connected to an impedance analyzer similar to that described above through a 4-terminal cable 7.

Then, a tensile load was applied to the linear metal member 1, and an alternating current having a frequency f of 1 MHz or 10 MHz at a voltage of 1 V was supplied to flow across the linear metal member 1, thereby measuring an impedance |Z| between both the terminals 5 and 6 by utilizing a 4-terminal process.

In the measurement, the tensile load on the linear metal member 1 was varied in a range of 0 to 1 kg f, so that the stress σ in the linear metal member 1 was varied in a range of 0 to about 81 kg f/mm².

Figure 20:
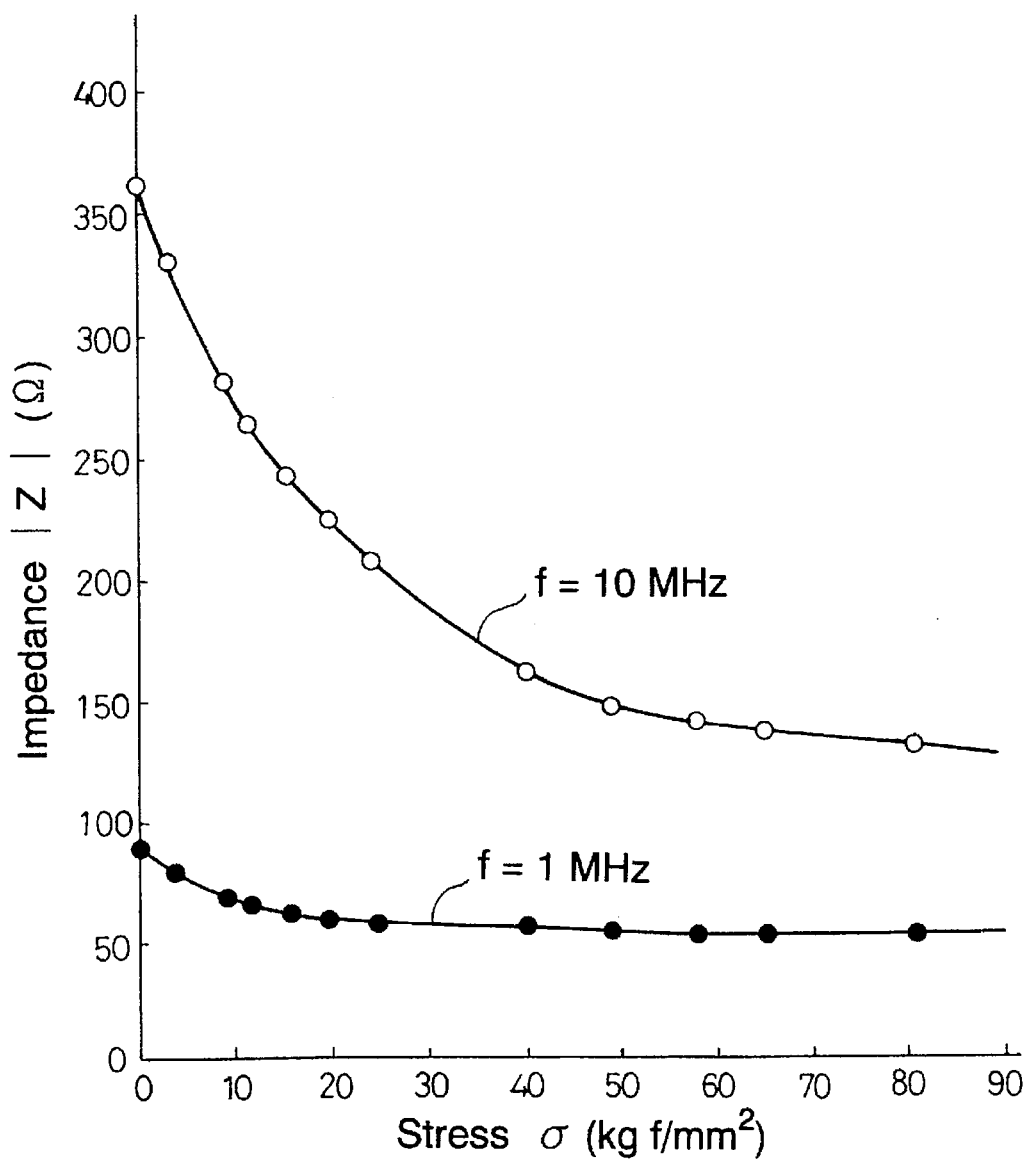
FIG. 20 is a graph illustrating a fourth example of the relationship between the stress σ and the impedance |Z|.

FIG. 20 shows results of the measurement. As apparent from FIG. 20, if the frequency f is set at 10 MHz, the impedance |Z| is decreased at a high sensitivity relative to an increase in stress σ. When the frequency is of 1 MHz, the decrease in impedance |Z| is slightly slow.

Figure 21:
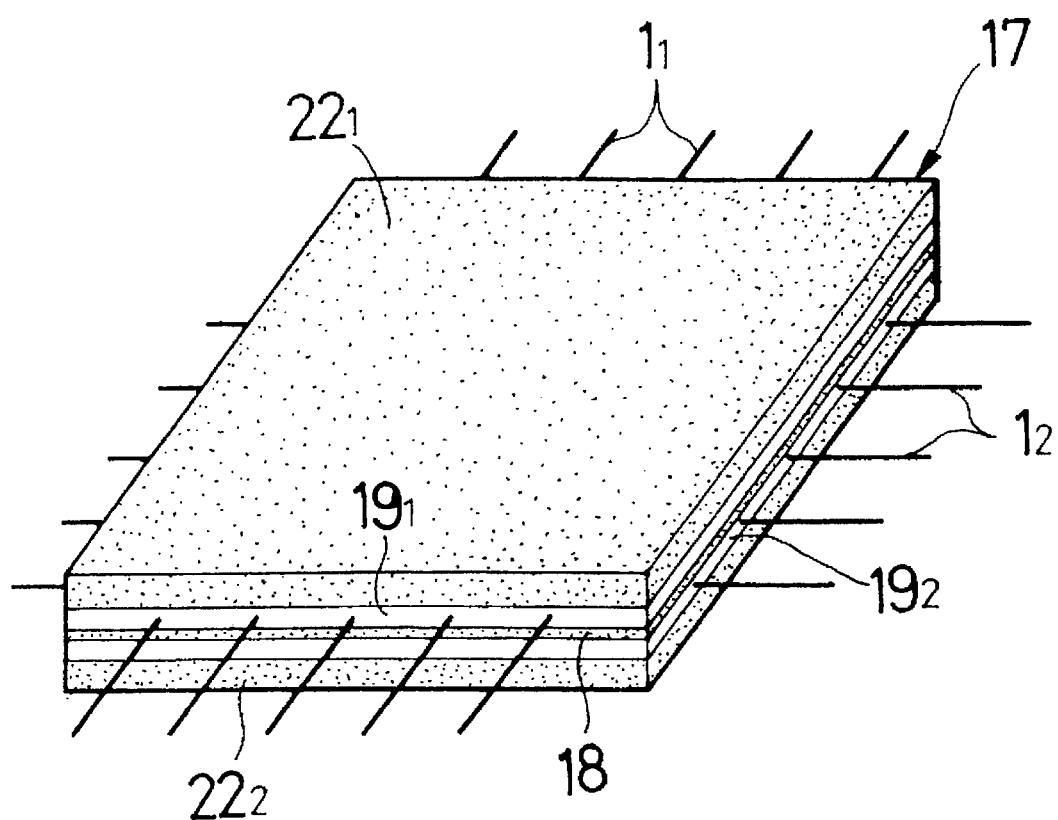
FIG. 21 is a perspective view of a sheet-like sensor.
Figure 22:
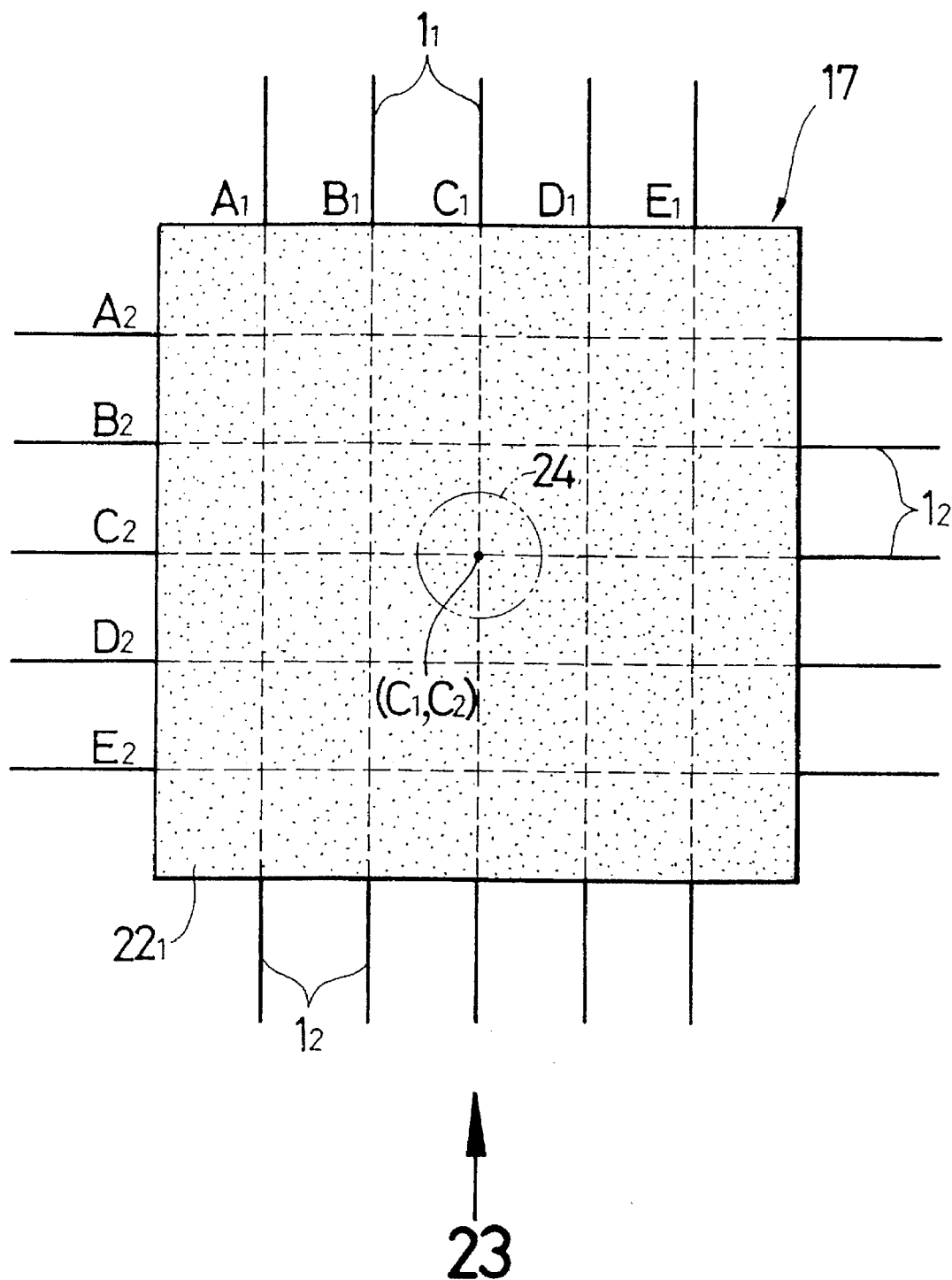
FIG. 22 is a plan view of the sheet-like sensor.
Figure 23:
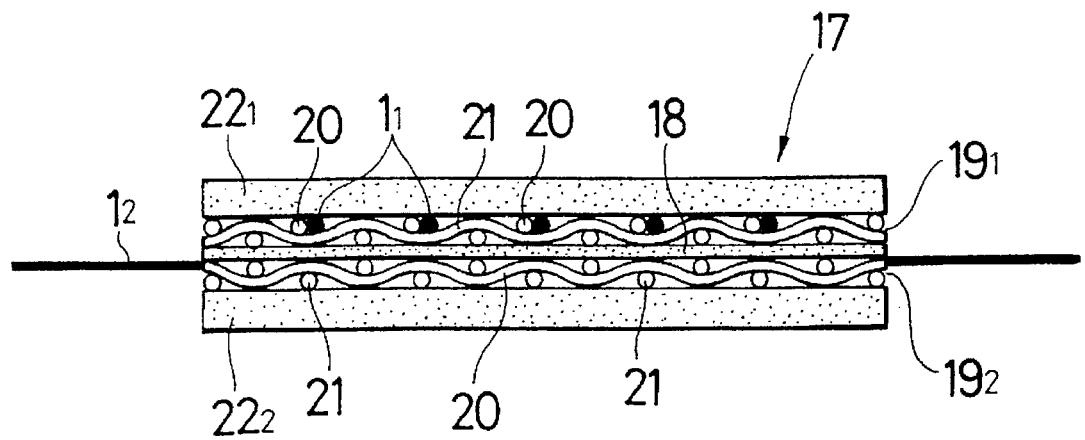
FIG. 23 is a view taken in the direction indicated by arrow 23 of FIG. 22.

Referring to FIGS. 21 to 23, a stress-distribution measuring sheet-like sensor 17 includes a plurality of, e.g., five (in the embodiment) first ferromagnetic linear metal members $1_1$ which are arranged side by side in parallel to one another on one side of an electrically insulating sheet (including a film) 18; and a plurality of, e.g., five (in the embodiment) second ferromagnetic linear metal members $1_2$ which are arranged side by side in parallel to one another on the other side of the electrically insulting sheet (including a film) 18 to intersect the first linear metal members $1_1$. The first and second ferromagnetic metal members are used for measuring impedance |Z| or an ohmic resistance R.

Each of the first and second linear metal members $1_1$ and $1_2$ is made of an amorphous iron-based alloy having a composition of $Fe_{77.5}Si_{7.5}B_{15}$ (each numerical value represents atom %), and has a diameter of 125 μm and a length of 500 mm.

The first and second linear metal members $1_1$ and $1_2$ are woven into plain-woven glass cloths $19_1$ and $19_2$ which are in turn composed of warp 20 and weft 21. Warp 20 and a weft 21 are made by twisting extremely fine nine hundred glass fibers having a diameter of 3 μm. Each of the glass cloths $19_1$ and $19_2$ has a length of 300 mm and a width of 300 mm, and the pitch of the first and second linear metal members $1_1$ and $1_2$ is 50 mm.

The electrically insulating sheet 18 is formed from a polyethylene terephthalate (PET) and has a thickness of 30 μm.

Figure 24:
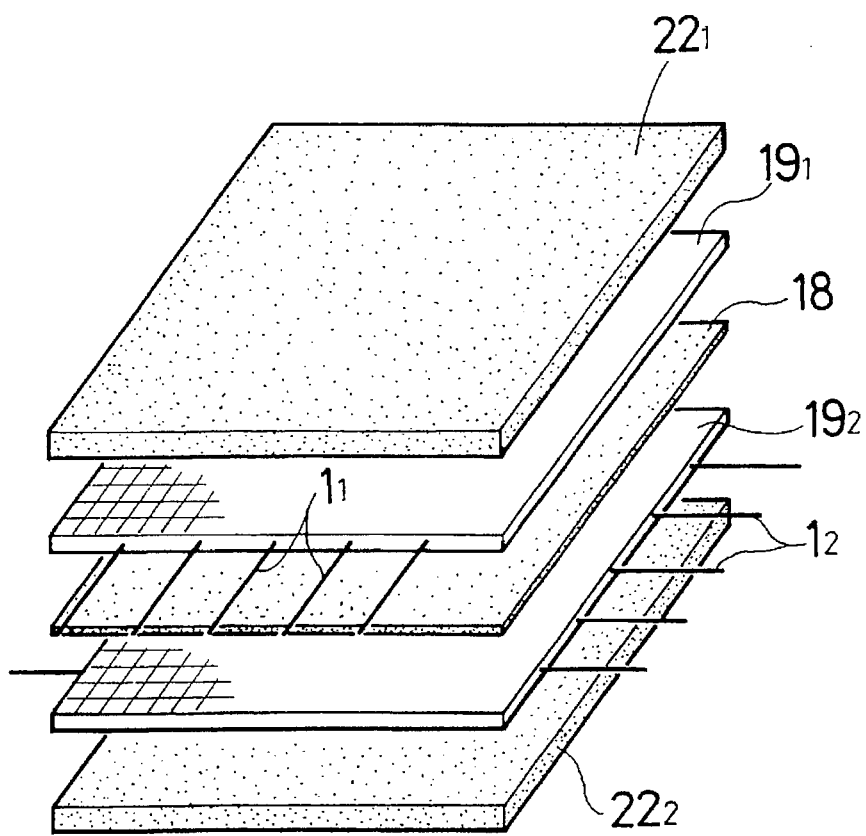
FIG. 24 is an exploded perspective view of the sheet-like sensor.

As shown in FIG. 24, the electrically insulating sheet 18 is sandwiched between the glass cloths $19_1$ and $19_2$ which are, in turn, sandwiched between two hard sponge plates $22_1$ and $22_2$ made from a synthetic rubber. Each of the sponge plates $22_1$ and $22_2$ has a length of 300 mm, a width of 300 mm and a thickness of 10 mm.

Figure 25:
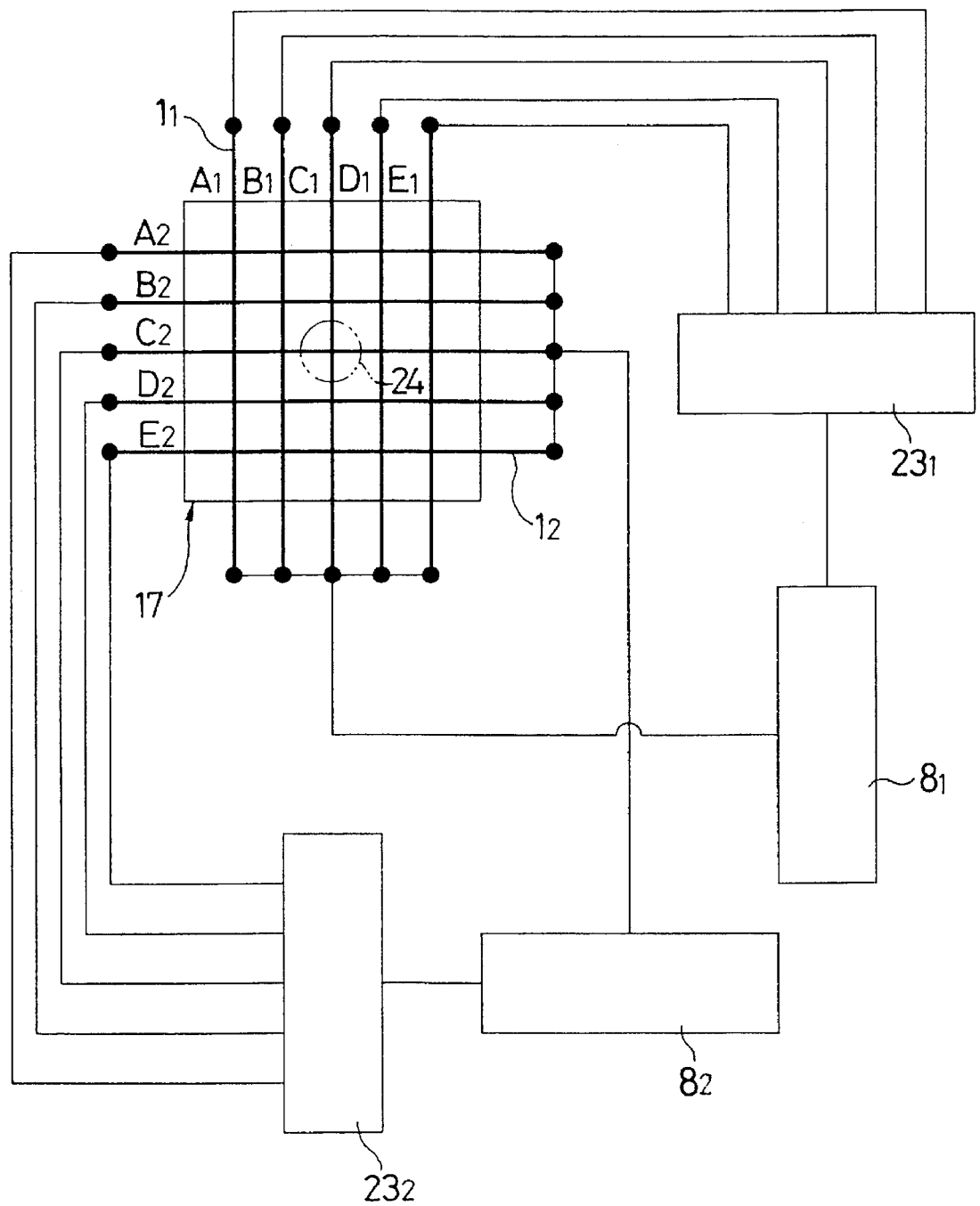
FIG. 25 is a schematic illustration of an electric circuit in a first example of a stress distribution measuring system.

FIG. 25 shows a first example of an electric circuit in the stress distribution measuring system. One end of each of the first linear metal members $1_1$ is connected to a scanner $23_1$, and the scanner $23_1$ and the other end of each first linear metal member $1_1$ are connected to an impedance analyzer $8_1$ similar to that described above in Embodiment I. Likewise, one end of each of the second linear metal members $1_2$ is connected to a scanner $23_2$, and the scanner $23_2$ and the other end of each second linear metal member $1_2$ are connected to an impedance analyzer $8_2$ similar to that described above in Embodiment I.

In this case, for convenience, the five first linear metal members $1_1$ are called $A_1$ to $E_1$ lines, respectively, and the five second linear metal members $1_2$ are called $A_2$ to $E_2$ lines, respectively, as shown in FIGS. 22 and 25.

In measuring the stress distribution, a columnar weight 24 having a diameter of 60 mm and a mass of 12 kg was placed on the sensor 17, so that the center of the weight 24 was located substantially at a phantom intersection ($C_1$, $C_2$) which was the center of the sensor 17, and a load was applied to the sensor 17 from a flat surface of the sensor 17.

Then, an alternating current having a frequency f of 1 MHz at a voltage of 1 V was supplied to flow across the $A_1$ to $E_1$ lines and the $A_2$ to $E_2$ lines to measure an impedance |z| in each of the $A_1$ to $E_1$ lines and the $A_2$ to $E_2$ lines sequentially.

Table 1 shows the relationship between the measured value of impedance |z| in each of the $A_1$ to $E_1$ lines and the $A_2$ to $E_2$ lines and the stresses σ obtained from reading the graph of FIG. 20 (f=1 MHz) based on the measured value.

TABLE 1

|  | Impedance |z| (Ω) | Stress σ (kg f/mm²) |
| --- | --- | --- |
| $A_1$ line | 84.9 | 4 |
| $B_1$ line | 70.6 | 8 |
| $C_1$ line | 57.7 | 40 |
| $D_1$ line | 69.6 | 10 |
| $E_1$ line | 70.4 | 8 |
| $A_2$ line | 80.3 | 3.5 |
| $B_2$ line | 59.2 | 24 |
| $C_2$ line | 57.8 | 40 |
| $D_2$ line | 61 | 16 |
| $E_2$ line | 89.1 | 0 |

FIG. 26 shows the sum of the stresses σ of the $A_1$ and $A_2$ lines, the $B_1$ and $A_2$ lines and the other lines which are in a mutually intersecting relation, as a stress σ at each of phantom intersections ($A_1$, $A_2$), ($B_1$, $A_2$) and the like of the $A_1$ and $A_2$ lines, the $B_1$ and $A_2$ lines and the like. In FIG. 26, the unit of each numerical value is kg f/mm².

As apparent from FIG. 26, when the load is applied at the phantom intersection ($C_1$, $C_2$) which is the center of the sensor and to the vicinity thereof, a stress distribution is presented in which the stress σ is largest at the phantom intersection ($C_1$, $C_2$) and is gradually decreased from the phantom intersection ($C_1$, $C_2$) toward an outer periphery of the sensor 17.

However, the stress σ is larger on the side of the $E_1$ line than on the side of the $A_1$ line with respect to the $C_1$ line, and is larger on the side of the $A_2$ line than on the side of the $E_2$ line with respect to the $C_2$ line. This is attributable to the fact that the center of the weight 24 is offset from the phantom intersection ($C_1$, $C_2$) and located in an area surrounded by the phantom intersections ($C_1$, $C_2$), ($C_1$, $B_2$), ($D_1$, $B_2$) and ($D_1$, $C_2$).

Then, the stress distribution was measured in the same manner under the same conditions, except that the frequency f of the alternating current was set at 10 MHz.

Table 2 shows the relationship between the measured value of impedance |z| in each of the $A_1$ to $E_1$ lines and the $A_2$ to $E_2$ lines and the stresses σ obtained from reading the graph of FIG. 20 (f=10 MHz) based on these measured value.

TABLE 2

|  | Impedance |z| (Ω) | Stress σ (kg f/mm²) |
|---|---|---|
| $A_1$ line | 360 | 0.5 |
| $B_1$ line | 328 | 3.5 |
| $C_1$ line | 134 | 70 |
| $D_1$ line | 254 | 13 |
| $E_1$ line | 297 | 7 |
| $A_2$ line | 360 | 0.5 |
| $B_2$ line | 231 | 18 |
| $C_2$ line | 151 | 45 |
| $D_2$ line | 248 | 14 |
| $E_2$ line | 362 | 0 |

FIG. 27 shows the sum of the stresses σ of the $A_1$ and $A_2$ lines, the $B_1$ and $A_2$ lines and the other lines which are in a mutually intersecting relation, as a stress σ at each of phantom intersections ($A_1$, $A_2$), ($B_1$, $A_2$) and the like of the $A_1$ and $A_2$ lines, the $B_1$ and $A_2$ lines and the like. In FIG. 27, the unit of each numerical value is kg f/mm².

As apparent from FIG. 27, even in this case, a stress distribution similar to that described above is presented. The measurement of the stress distribution can also be achieved based on the ohmic resistance R.

Example 2

Figure 28:
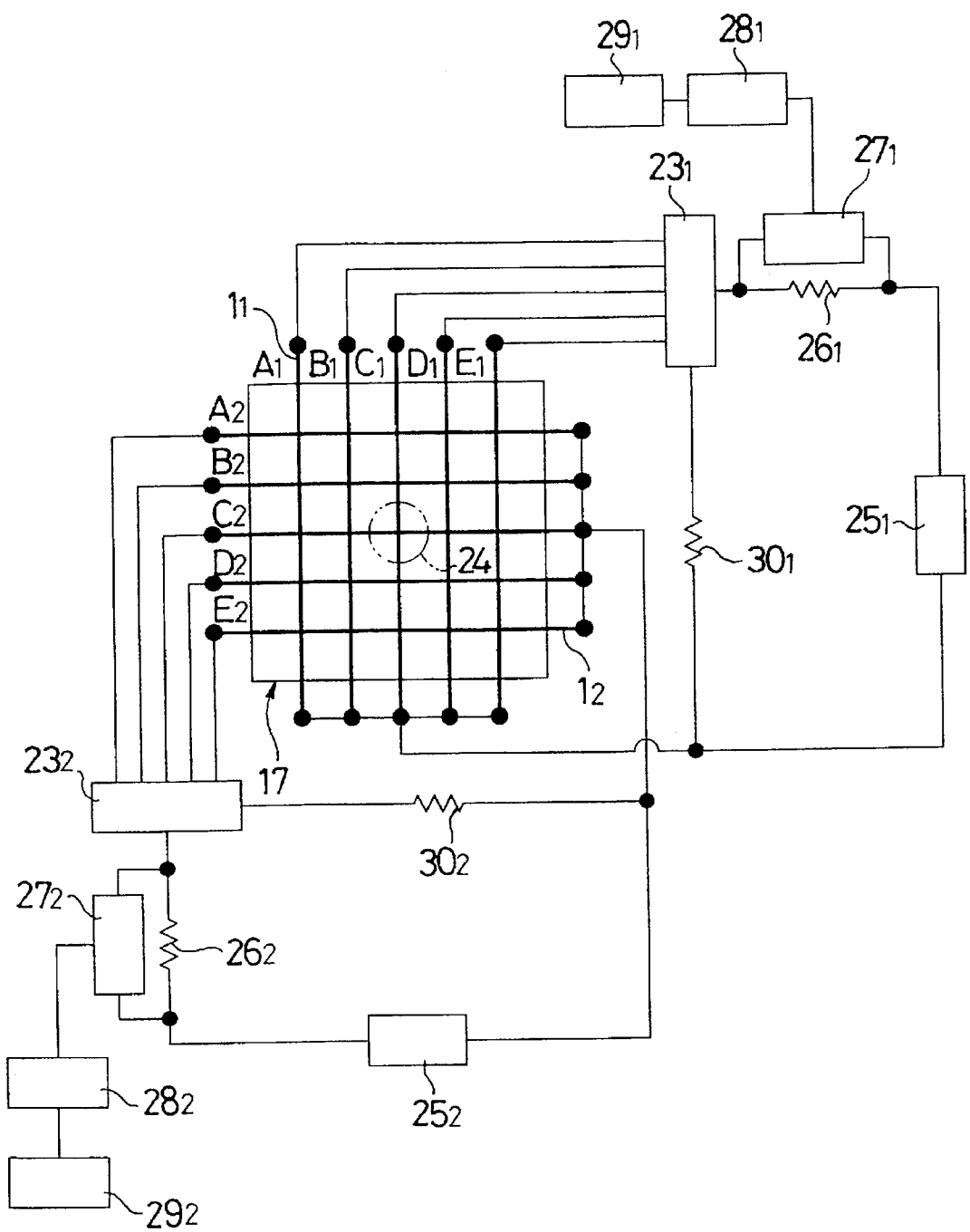
FIG. 28 is an illustration of an electric circuit in a second example of a stress distribution measuring system.

FIG. 28 shows a second example of an electric circuit in the stress distribution measuring system. One end of each of the first linear metal members $1_1$, i.e., each of the $A_1$ to $E_1$ lines, is connected to the scanner $23_1$, and the other end of each of the $A_1$ to $E_1$ lines is connected to an oscillator $25_1$. Further, the scanner $23_1$ and the oscillator $25_1$ are interconnected through a resistor $26_1$, and a voltage measuring device $27_1$ is connected to the resistor $26_1$ in order to measure the voltage applied to the resistor $26_1$. The measured value determined by the voltage measuring device $27_1$ is inputted into CPU $29_1$ via an AD converter $28_1$ and the processed in the CPU $29_1$.

Likewise, one end of each of the second linear metal members $1_2$, i.e., each of the $A_2$ to $E_2$ lines, is connected to the scanner $23_2$, and the other end of each of the $A_2$ to $E_2$ lines is connected to an oscillator $25_2$. Further, the scanner $23_2$ and the oscillator $25_2$ are interconnected through a resistor $26_2$, and a voltage measuring device $27_2$ is connected to the resistor $26_2$ in order to measure the voltage applied to the resistor $26_2$. The measured value determined by the voltage measuring device $27_2$ is inputted into CPU $29_2$ via an AD converter $28_2$ and then processed in the CPU $29_2$. In FIG. 28, there are reference resistors $30_1$ and $30_2$ interposed between one end of lines $A_1$ to $E_1$ and $A_2$ and $E_2$, on the one hand, and scanners $23_1$ and $23_2$, respectively, on the other.

This electric circuit is arranged based on the following principle. For example, when the case of the $A_1$ line is taken, the $A_1$ line, the resistor $26_1$ and the oscillator $25_1$ are connected in series. Here, if the impedance of the $A_1$ line is represented by Z, the resistance value of the resistor $26_1$ is represented by R (constant), and the A.C. voltage of the oscillator $25_1$ is represented by E (constant), when an electric current I is supplied to the $A_1$ line and the resistor $26_1$, a relation IZ+IR=E is established.

The measured resistor voltage $E_R$ (wherein $E_R<E$) determined by the voltage measuring device $27_1$ is equal to IR and hence, a relation of $I=E_R R$ can be established. In view of this relation, the above expression can be expressed as $Z=(E R/E_R)-R$.

Because the A.C. voltage E and the resistance value R are constant, an impedance Z can be determined by measuring the voltage $E_R$, and a stress σ then can be determined from reading the graph of FIG. 20 using the impedance Z.

Figure 29:
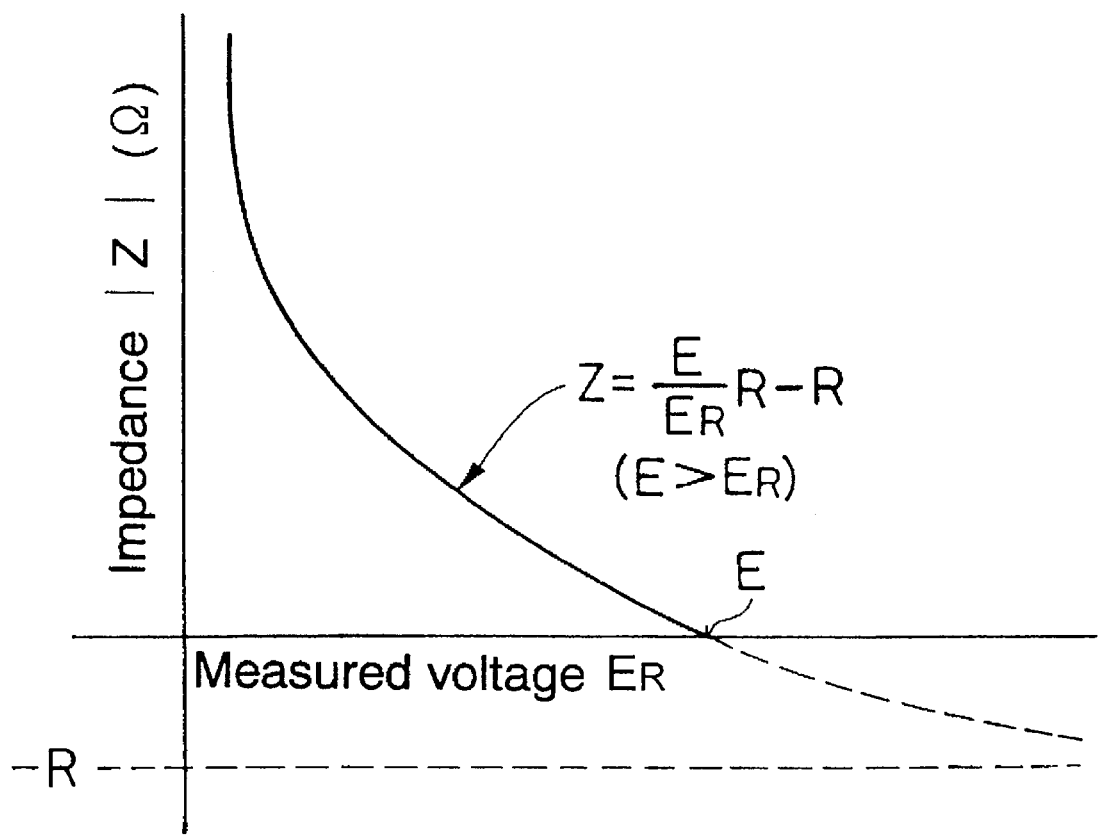
FIG. 29 is a graph illustrating the relationship between the measured voltage $E_R$ and the impedance Z.

In this case, if the measured voltage $E_R$ is taken on the axis of abscissas and the impedance Z is taken on the axis of ordinates, as shown in FIG. 29, the expression, $Z=(ER/E_R)-R$ describes a portion of a hyperbolic curve and therefore, the stress distribution can be easily determined by considering the measured voltage $E_R$ as a stress σ from the characteristic of impedance |Z|-stress σ shown in FIG. 20.

In the measurement of the stress distribution by this easy method, a columnar weight 24 having a diameter of 60 mm and a weight of 12 kg was placed on a sensor 17, so that the center of the weight 24 was located substantially at the phantom intersection ($C_1$, $C_2$) which was the center of the sensor 17, and a load was applied to the sensor 17 from a flat surface of the sensor 17.

Then, an alternating current having a frequency f of 1 MHz at an A.C. voltage E of 4.5 V was supplied to the $A_1$ to $E_1$ lines and the resistor $26_1$ to the $A_2$ to $E_2$ lines and the resistors $26_2$ to measure a voltage $E_R$ applied to the resistor $26_1$, $26_2$ in each of the lines.

Table 3 shows the measured voltages $E_R$ for the $A_1$ to $E_1$ lines and the $A_2$ to $E_2$ lines.

TABLE 3

|  | Measured voltage $E_R$ (V) |
|---|---|
| $A_1$ line | 3.16 |
| $B_1$ line | 3.26 |
| $C_1$ line | 3.6 |
| $D_1$ line | 3.28 |
| $E_1$ line | 3.24 |
| $A_2$ line | 3.16 |
| $B_2$ line | 3.36 |
| $C_2$ line | 3.4 |
| $D_2$ line | 3.28 |
| $E_2$ line | 3.16 |

FIG. 30 shows the sum of the measured voltage $E_R$ of the $A_1$ and $A_2$ lines, the $B_1$ and $A_2$ lines and the other lines which are in a mutually intersecting relation, as a stress σ at each of phantom intersections ($A_1$, $A_2$), ($B_1$, $A_2$) and the like of the $A_1$ and $A_2$ lines, the $B_1$ and $A_2$ lines and the like. In FIG. 30, the unit of each numerical value is V.

As apparent from FIG. 30, even in this case, a stress distribution similar to that described above is presented.

The stress distribution measuring method can be also applied to the measurement of a load distribution by a driver on a driver's seat in a vehicle or the like.

If an insulating coating film is provided on at least one of the first and second linear metal members $1_1$ and $1_2$ in the sheet-like sensor 17, the electric insulating sheet 18 is not required.

What is claimed is:

1. A method for measuring a stress of a ferromagnetic metal member, comprising the steps of:
    supplying an alternating current to flow across the ferromagnetic metal member to measure an impedance |Z| of said ferromagnetic metal member; and
    determining a stress σ of said ferromagnetic metal member based on the measured value of the impedance |Z| from a relationship between the impedance |Z| and the stress σ which said ferromagnetic metal member possesses.

2. A method for measuring a stress of a ferromagnetic metal member according to claim 1, wherein said ferromagnetic metal member is made from an amorphous alloy.

3. A method for measuring a stress of a ferromagnetic metal member according to claim 2, wherein said amorphous alloy is an amorphous iron-based alloy.

4. A method for measuring a stress of a ferromagnetic metal member according to claim 3, wherein a frequency f of said alternating current is in a range of f≧300 kHz.

5. A method for measuring a stress of a ferromagnetic metal member according to claim 1, 2, 3 or 4, wherein said ferromagnetic metal member is linear.

6. A method for measuring a stress of a ferromagnetic metal member, comprising the steps of:
    supplying an alternating current to flow across the ferromagnetic metal member to measure an ohmic resistance R of said ferromagnetic metal member, and
    determining a stress σ of said ferromagnetic metal member based on the measured value of the ohmic resistance R from a relationship between the ohmic resistance R and the stress σ which said ferromagnetic metal member possesses.

7. A method for measuring a stress of a ferromagnetic metal member according to claim 6, wherein said ferromagnetic metal member is made from an amorphous alloy.

8. A method for measuring a stress of a ferromagnetic metal member according to claim 7, wherein said amorphous alloy is an amorphous iron-based alloy.

9. A method for measuring a stress of a ferromagnetic metal member according to claim 8, wherein a frequency f of said alternating current is in a range of f≧300 kHz.

10. A method for measuring a stress of a ferromagnetic metal member according to claim 6, 7, 8 or 9, wherein said ferromagnetic metal member is linear.

11. A method for measuring a stress distribution in a sheet-like sensor, comprising the steps of:
    preparing a sheet-like sensor including a plurality of first ferromagnetic metal members which are arranged in parallel to one another, and a plurality of second ferromagnetic metal members which are arranged in parallel to one another to intersect said first ferromagnetic metal members and which are electrically insulated from said first ferromagnetic metal members;
    supplying an alternating current to flow across each of said first and second ferromagnetic metal members in a condition in which a load has been applied to said sensor from one flat side of said sensor, thereby measuring an impedance |Z| of each of said first and second ferromagnetic metal members;
    determining a stress σ of each of said first and second ferromagnetic metal members, based on the measured value of the impedance |Z| from a relationship between the impedance |Z| and the stress σ which each of said first and second ferromagnetic metal members possesses, and then
    determining a sum of the stresses σ of the first and second ferromagnetic metal members which are in a mutually intersecting relation to define said sum of the stresses σ as a stress σ at a phantom intersection of said first and second ferromagnetic metal members.

12. A method for measuring a stress distribution in a sheet-like sensor according to claim 11, wherein each of said first and second ferromagnetic metal members is made from an amorphous alloy.

13. A method for measuring a stress distribution in a sheet-like sensor according to claim 12, wherein said amorphous alloy is an amorphous iron-based alloy.

14. A method for measuring a stress distribution in a sheet-like sensor according to claim 13, wherein a frequency f of said alternating current is in a range of f≧300 kHz.

15. A method for measuring a stress distribution in a sheet-like sensor according to claim 11, 12, 13 or 14, wherein each of said first and second ferromagnetic metal members is linear.

16. A method for measuring a stress distribution in a sheet-like sensor, comprising the steps of:
    preparing a sheet-like sensor including a plurality of first ferromagnetic metal members which are arranged in parallel to one another, and a plurality of second ferromagnetic metal members which are arranged in parallel to one another to intersect the first ferromagnetic metal members and which are electrically insulated from the first ferromagnetic metal members;
    supplying an alternating current to flow across each of the first and second ferromagnetic metal members in a condition in which a load has been applied to said sensor from one flat side of said sensor, thereby measuring an ohmic resistance R of each of said first and second ferromagnetic metal members;
    determining a stress σ of each of said first and second ferromagnetic metal members, based on the measured value of the ohmic resistance R from a relationship between the ohmic resistance R and the stress σ which each of said first and second ferromagnetic metal members possesses; and then
    determining a sum of the stresses σ of the first and second ferromagnetic metal members which are in a mutually intersecting relation to define the sum of the stresses σ as a stress σ at a phantom intersection of said first and second ferromagnetic metal members.

17. A method for measuring a stress distribution in a sheet-like sensor according to claim 16, wherein each of said first and second ferromagnetic metal members is made from an amorphous alloy.

18. A method for measuring a stress distribution in a sheet-like sensor according to claim 17, wherein said amorphous alloy is an amorphous iron-based alloy.

19. A method for measuring a stress distribution in a sheet-like sensor according to claim 18, wherein a frequency f of said alternating current is in a range of f≧300 kHz.

20. A method for measuring a stress distribution in a sheet-like sensor according to claim 16, 17, 18 or 19, wherein each of said first and second ferromagnetic metal member is linear.

21. A sheet-like sensor for measuring a stress distribution, comprising, a plurality of first ferromagnetic metal members which are arranged in parallel to one another and subject to a measurement of at least one of an impedance |Z| and an ohmic resistance R; and a plurality of second ferromagnetic metal members which are arranged in parallel to one another to intersect said first ferromagnetic metal members and are electrically insulated from said first ferromagnetic metal members, and which are used for measuring at least one of the impedance |Z| and the ohmic resistance R, the sum of stresses $\sigma$ of the first and second ferromagnetic metal members which are in a mutually intersecting relation being defined as a stress $\sigma$ at a phantom intersection of said first and second ferromagnetic metal members.

22. A sheet-like sensor for measuring a stress distribution according to claim 21, wherein each of said first and second ferromagnetic metal members is made from an amorphous alloy.

23. A sheet-like sensor for measuring a stress distribution according to claim 22, wherein said amorphous alloy is an amorphous iron-based alloy.

24. A sheet-like sensor for measuring a stress distribution according to claim 21, 22 or 23, wherein each of said first and second ferromagnetic metal members is linear.

\* \* \* \* \*